US010841777B1

(12) United States Patent
Allen

(10) Patent No.: US 10,841,777 B1
(45) Date of Patent: Nov. 17, 2020

(54) PROFESSIONAL QUALIFICATION TRACKING AND MANAGEMENT SYSTEM AND METHOD

(71) Applicant: Robert Steven Allen, Vienna, VA (US)

(72) Inventor: Robert Steven Allen, Vienna, VA (US)

( * ) Notice: Subject to any disclaimer, the term of this patent is extended or adjusted under 35 U.S.C. 154(b) by 0 days.

(21) Appl. No.: 16/685,055

(22) Filed: Nov. 15, 2019

Related U.S. Application Data

(60) Provisional application No. 62/767,844, filed on Nov. 15, 2018.

(51) Int. Cl.
*H04M 11/04* (2006.01)
*H04W 4/90* (2018.01)
(Continued)

(52) U.S. Cl.
CPC .............. *H04W 4/90* (2018.02); *G06Q 10/10* (2013.01); *H04M 3/5116* (2013.01);
(Continued)

(58) Field of Classification Search
CPC ........... H04W 55/0229; H04M 1/7253; A61M 5/172; A61M 5/1723; A61M 2205/3561;
(Continued)

(56) References Cited

U.S. PATENT DOCUMENTS 7,496,518 B1\* 2/2009 Cayton .................. G06Q 10/10
705/321
8,063,737 B2 11/2011 Connell et al.
(Continued)

FOREIGN PATENT DOCUMENTS

WO 2004086193 A2 10/2004
WO 2014055735 A2 4/2014
WO 2014055735 A3 7/2014

OTHER PUBLICATIONS

"Whole Community | FEMA.gov" | webpage as provided by Internet Archive Wayback Machine at <https://web.archive.org/web/20170902234718/https://www.fema.gov/whole-community>, published on or before Sep. 2, 2017, retrieved on Jun. 29, 2020 | Year: 2017.

(Continued)

*Primary Examiner* — Danh C Le
(74) *Attorney, Agent, or Firm* — Hanrahan Law Firm P.A.; Benjamin Hanrahan

(57) ABSTRACT

A system and method for managing the qualifications of emergency management personnel through the use of at least partially automated qualification management devices or electronic Position Task Books (ePTBs) is presented herein. The system includes a network of participating organizations comprising governmental agencies, non-governmental organizations (NGOs), academic institutions, and the private sector. The qualification management devices or ePTBs are used to establish the suitability of the personnel or individual participants in the performance of emergency management duties in the areas of emergency preparedness, planning, response, recovery, etc. More specifically, the present invention is directed to a system and/or method for the management (including the issuance, execution, and review) of qualification management devices or ePTBs within a self-managed network of participating organizations using internet and mobile technology to deliver ePTBs. The content of these ePTBs will be based on nationally defined qualification standards developed by network participants.

15 Claims, 18 Drawing Sheets

(51) Int. Cl.
*H04W 76/50* (2018.01)
*G06Q 10/10* (2012.01)
*H04M 3/51* (2006.01)
*H04W 4/029* (2018.01)
*H04W 88/02* (2009.01)
*H04W 8/24* (2009.01)

(52) U.S. Cl.
CPC ............ *H04W 4/029* (2018.02); *H04W 76/50* (2018.02); *H04M 2242/04* (2013.01); *H04W 8/245* (2013.01); *H04W 88/02* (2013.01)

(58) Field of Classification Search
CPC ...... A61M 2205/3584; A61M 2205/50; A61M 2205/505; A61M 2205/702; A61M 2205/8212; A61M 2230/203
USPC ................. 455/404.1, 456.1, 418; 705/321
See application file for complete search history.

(56) References Cited

U.S. PATENT DOCUMENTS

| | | | |
|---|---|---|---|
| 8,548,911 | B2 | 10/2013 | Dent et al. |
| 9,942,695 | B2 | 4/2018 | Goad |
| 10,104,526 | B2 | 10/2018 | Metke et al. |
| 2002/0106622 | A1 | 8/2002 | Osborne et al. |
| 2003/0125998 | A1 | 7/2003 | McKenney et al. |
| 2007/0118522 | A1* | 5/2007 | Sperle ............ G06Q 10/063112 |
| 2008/0085501 | A1 | 4/2008 | Novack et al. |
| 2008/0320572 | A1 | 12/2008 | Connell et al. |
| 2009/0132813 | A1 | 5/2009 | Schibuk |
| 2011/0106566 | A1 | 5/2011 | Levins |
| 2011/0238591 | A1* | 9/2011 | Kerr ....................... G06Q 10/06 705/321 |
| 2014/0094188 | A1* | 4/2014 | Kazmi .................. G01S 5/0242 455/456.1 |
| 2014/0156686 | A1 | 6/2014 | Woodings et al. |
| 2014/0279611 | A1 | 9/2014 | Evans et al. |
| 2015/0134717 | A1* | 5/2015 | Naganuma .......... G06F 11/1464 709/201 |
| 2015/0379523 | A1 | 12/2015 | Sharma |
| 2016/0096539 | A1* | 4/2016 | Bartek .................. B61L 25/026 246/123 |
| 2016/0098666 | A1* | 4/2016 | Hojby ............ G06Q 10/063112 705/7.14 |
| 2017/0154311 | A1* | 6/2017 | Lewis ................ G06Q 10/1053 |
| 2018/0233042 | A1* | 8/2018 | Zhang ............... G08G 1/096791 |
| 2018/0314601 | A1* | 11/2018 | Jain ........................ G06F 11/142 |
| 2019/0130361 | A1* | 5/2019 | Hazarika ............ G06Q 10/1053 |

OTHER PUBLICATIONS

"GAO report criticizes FEMA's response to Hurricane Maria in Puerto Rico—CBS News"| webpage as provided by Internet Archive Wayback Machine at <https://web.archive.org/web/20181027152923/https://www.cbsnews.com/news/gao-report-criticizes-fema-response-to-hurricane-maria-in-puerto-rico/>, published on or before Oct. 27, 2018, retrieved on Jun. 29, 2020 | Year: 2018.

* cited by examiner

PROFESSIONAL QUALIFICATION TRACKING AND MANAGEMENT SYSTEM AND METHOD

CLAIM OF PRIORITY/CROSS-REFERENCE TO RELATED APPLICATION

The present application is based on and a claim of priority is made under 35 U.S.C. § 119(e) to provisional patent application Ser. No. 62/767,844, filed on Nov. 15, 2018, the entire content of which is incorporated herein in its entirety by reference.

FIELD OF THE INVENTION

The present invention generally relates to a system and method for managing the qualifications of emergency management personnel, for example, through the use of at least partially automated qualification management devices or electronic Position Task Books (ePTBs) administered through a network of participating organizations comprising governmental agencies, non-governmental organizations (NGOs), academic institutions, and the private sector. These qualification management devices or ePTBs are used to establish the suitability of the personnel or individual participants in the performance of emergency management duties in the areas of emergency preparedness, planning, response, recovery, etc. More specifically, the present invention is directed to a system and/or method for the management (including the issuance, execution, and review) of qualification management devices or ePTBs via a network or system of participating organizations.

BACKGROUND OF THE INVENTION

When a local jurisdiction, such as a state or county government, is overwhelmed by a disaster, responsible authorities within that jurisdiction often make requests for resources to external or other organizations. For instance, during or subsequent to a disaster, such as a major hurricane, fire, or earthquake, a county or other jurisdiction may not have sufficient emergency managers and first responders to manage the response to, and recovery from, the disaster. In these situations, the impacted jurisdiction will make requests to other organizations, often comprising external state and local governments, federal agencies, non-governmental organizations (NGO's), academic institutions, and private sector entities to provide supplemental personnel resources. During a large disaster, these external resources may be numbered in the hundreds or thousands. These requests will typically be joined with a promise of reimbursement via some form of mutual aid agreement.

It is critical for all involved parties to reliably establish that the provided personnel resources are fully qualified to perform in the duty for which they were requested. There are a number of reasons for this: the personnel may be required to work in a hazardous environment or in austere conditions which could expose them to personal risk; the personnel may be performing in a capacity where their decisions and actions directly impact human health, the environment, or sensitive historical or cultural resources; or the personnel may be performing in a capacity where their decisions and actions have significant financial implications. Further, during a large disaster response, supplemental personnel reimbursement costs may total to tens or hundreds of millions of dollars. Consequently, it is critical that the requesting jurisdiction can be confident that the personnel provided by external organizations are fully qualified to perform their assigned duties.

This problem is further aggravated by the issue of nepotism, wherein individuals who know each other personally vouch for one another's qualifications. This may be done out of friendship, or due to a financial motivation because deployed responders are typically paid for their time whether working individually or on behalf of a contractor or engineering services provider. These factors drive a commonly recognized and long-standing problem of responders not being fully qualified to perform in their requested duties.

Historically, this need has been met in a limited fashion via manual position task books (PTBs) delivered via physical, paper-based media. Position Task Books (PTBs) are an established approach used to document the qualifications for emergency managers, fire fighters, police officers, and other workers operating in hazardous environments. PTBs have historically been delivered and managed via physical, paper-based books. For instance, the National Wildland Fire Coordinating Group (NWCG) publishes a variety of PTBs focused on responding to wildland fires. Similarly, the Federal Emergency Management Agency (FEMA) publishes a series of PTBs focused on managing large incidents which FEMA takes part in supporting. These PTBs are published on public-facing websites, which may then be printed and bound into paper based PTBs.

All of these organizations use a common parlance for describing qualifications requirements used in their respective PTBs. These include some or all of the following requirements which are defined for individual positions: training courses; $3^{rd}$ party certifications; education attainment; physical/medical fitness; professional or mission area experience, etc. In addition, these PTBs define a series of tasks. Tasks are actions performed by the individual pursuing the qualification (referred to as a candidate) which are observable by an authorized individual referred to as an evaluator. This evaluator will observe the tasks performed by the candidate using defined criteria, and will then certify that the task was completed successfully by granting an endorsement.

Again, these qualification requirements have historically been printed out as physical paper-based books, either bound or stapled together, collectively referred to as a Position Task Book (PTB). An individual will obtain a paper PTB which they will maintain on their person. They will then attempt to collect physical pen-and-ink endorsements from evaluators. Endorsements are commonly represented as a signature or initials. Once they have collected all required endorsements, they will submit their paper PTB to their appropriate supervising authority, who will review the paper PTB and affix their signature. At this point, the individual is considered fully qualified to perform in the given position.

This process is extremely problematic for a variety of reasons. For example, there is no single nationwide catalog which consolidates position qualification requirements across all hazard types, mission areas, and governing bodies. Furthermore, candidates have difficulty obtaining a PTB from an appropriate certifying authority. Even so, once issued, paper PTBs may be lost, damaged, destroyed, or altered. In addition, there is no ability to consistently control who is a certified evaluator, further complicated by the fact that existing paper-based approaches rely on often illegible pen or inked signatures and/or initials. Moreover, it is difficult to govern nepotistic or other personal relationships between candidates and evaluators. There is no standard ability for unrelated jurisdictions (e.g., two counties in different states) to establish trusted relationships enforcing qualification requirements between themselves. There is no nationwide registration of trusted, qualified emergency managers and responders which can be accessed for the purposes of fulfilling mutual aid requests during major disasters.

SUMMARY OF THE INVENTION

Accordingly, the present invention is directed to an automated system and method for managing the qualifications of emergency management personnel. More in particular, the system and method of at least one embodiment includes a management system (e.g., a server or system of servers) or a network of or accessibly by a plurality of participating entities such as governmental, NGO, academic, and private sector entities. The system will maintain a plurality of qualification management devices, referred to herein as ePTBs, that are configured to track the qualifications of a plurality of participating individuals or emergency management personnel. The ePTBs can be automatically generated and stored, and can be based on nationally and locally based qualification criteria. The system and method can automatically recommend qualified emergency personnel, for example, in times of need and disaster relief, based at least on part upon the content of the personnel's ePTB.

Accordingly, the various embodiments of the present invention will provide a number of advantages including, but not limited to: providing a central location, server or database for all participating governmental, NGO, and private sector entities to manage their position qualification environments; providing a novel, electronic mechanism allowing participating organizations to manage their data sharing and partnership relationships with other participating organizations and their own personnel; providing a novel, paperless, electronic, mechanism to allow participating organizations to issue, process, submit, review, and approve PTBs; providing a novel, electronic mechanism allowing emergency managers and responders to control their own qualifications management process and career progression; and provide a central nationwide roster of trusted, qualified emergency managers and responders available for mutual aid requests during disasters and certification processes.

Furthermore, as described herein, at least one embodiment of the present invention includes at a management system, server or central database that is accessible to all network participants managing position qualification requirements. The management system acts as a network of participating organizations allowing for partnership and data sharing relationships between the various participating entities or organizations and personnel associated with those organizations. The management system of some embodiments will allow participating entities or organizations to configure settings for their ePTBs, review issued PTBs and their current status; configure the PTB submittal and review process, and review awarded ePTBs and associated qualified positions.

In addition, at least one embodiment of the present invention includes a software tool that allows a participating organization's authorized staff members to: author their own custom qualification requirements; manage their data sharing and partnership relationships with other participating organizations; manage their own Personnel; issue, manage, track, review, and approve submitted PTBs; and peruse available qualified personnel throughout the entire network. The software tool includes traditional PC/laptop/tablet user interfaces as well as mobile device user interfaces.

Further embodiments may also include a mobile-friendly or mobile-based software tool that allows participating individuals to self-manage: their own accounts, notification preferences, and privacy settings; their relationships with participating organizations; their own PTBs, obtaining and awarding task endorsements, submitting for approval, and monitoring the approval process; their relationship with assigned candidates and endorsers; and their own qualification history and credentials. The software tool includes both PC/laptop/tablet user interface components as well as mobile device based user interface components.

As will be described herein, at least one embodiment of the present invention is structured and configured to provide and in some cases automate a plurality of different processes or steps in the process of managing ePTBs, including for example: managing the definition of master nationwide qualification requirements; customization of qualification requirements to meet the specific needs of state and local governments, NGOs, and private sector organizations; identification of suitable candidates to take part in the qualification management process; management of participating organizations including: onboarding of new participating organizations; management of relationships between organizations; management of data sharing and other functions between organizations; and the management of associated personnel. Management of personnel includes onboarding new personnel, releasing personnel, adopting personnel released from other organizations, transferring personnel between organizations, assigning administrative roles to selected personnel, and establishing relationships with auxiliary personnel associated with a different primary organization; issuing ePTBs to selected candidates; administering the ePTB process including: assignment of evaluators; performing various administrative updates such as correction of endorsements or status updates; granting administrative waivers to various qualification requirements, etc.; executing the ePTB process, providing tools that allow candidates and evaluators to collaborate on the qualification process including: establishing and managing candidate/evaluator relationships; sending messages; attaching documents and comments; and obtaining task endorsements; providing candidates and evaluators participating in the qualifications management process with mobile device tools to manage their accounts and perform their respective qualifications management tasks; evaluating updating the completion status of ePTBs respective of various system actions and events; submitting ePTBs for review and approval; reviewing ePTBs; and approving ePTBs and completing the qualifications management process.

For instance, in at least one embodiment, the system and method of the present invention is structured and configured to generate consolidated ePTBs that are customized for a participating individual or candidate in that the ePTB will incorporate or include (1) all potential qualification requirements defined by their own organization, (2) all qualification requirements defined by their organization's superior organizations (e.g., Miami Fire Department→City of Miami Fla.→Dade County, Fla.→State of Florida), and (3) all nationally-defined qualifications requirements defined by master "National Resource Providers" (NRPs).

In some embodiments, the system and method may also include a mechanism allowing networks of Subject Matter Experts (SMEs) working for otherwise unrelated organizations to collaborate on the management of nationally defined qualifications requirements.

Furthermore, the system and method of at least one embodiment include functionality enabling participating individuals to own their qualifications profile in a manner that allows them to self-manage and render their profile portable throughout their career and between organizations with which they are associated.

Additional features may include functionality enabling the transparent, accountable, and efficient management and execution of candidate/evaluator relationships for the purposes of obtaining electronic task endorsement, functionality and mobile user interfaces which empower candidates and evaluators as the key stakeholders in the qualifications management process.

Some embodiments may also include a high performance ePTB Evaluation Algorithm which enforces consistency and updates ePTB statuses in real-time in response to a wide variety of system actions and events and/or an ePTB Qualifications Review Board (QRB) Algorithm which establishes and manages the ePTB review and approval workflow process between diverse stakeholders subject to complex rules.

These and other objects, features and advantages of the present invention will become more apparent when the drawings as well as the detailed description are taken into consideration.

BRIEF DESCRIPTION OF THE DRAWINGS

Like reference numerals refer to like parts throughout the several views of the drawings provided herein.

DETAILED DESCRIPTION OF THE INVENTION

The following description of exemplary embodiments of the invention is not intended to limit the scope of the invention to these exemplary embodiments, but rather to enable any person skilled in the art to make and use the invention.

Figure 1:
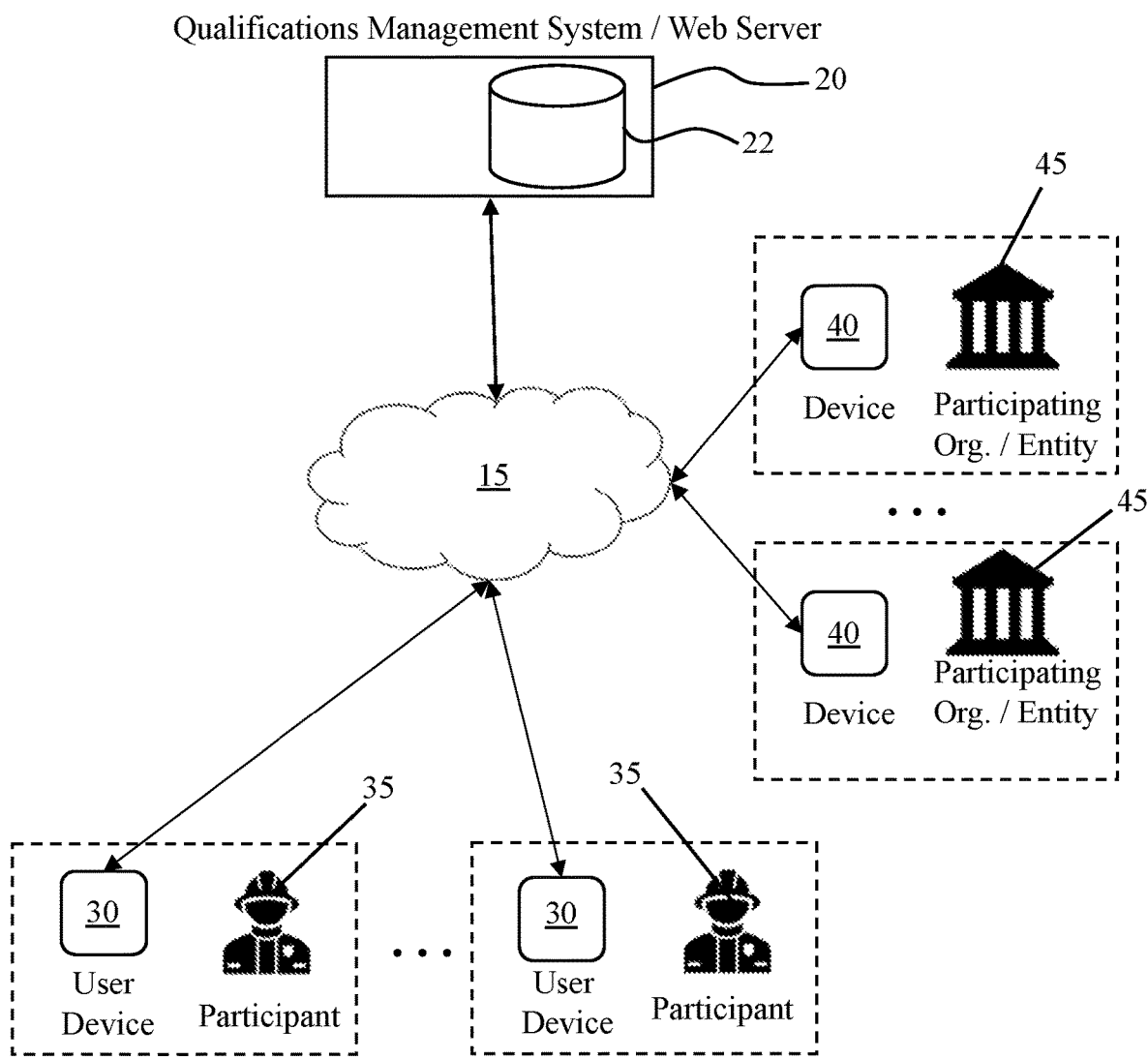
FIG. 1 is a block diagram illustrating the system as disclosed in accordance with at least one embodiment of the present invention.
Figure 4:
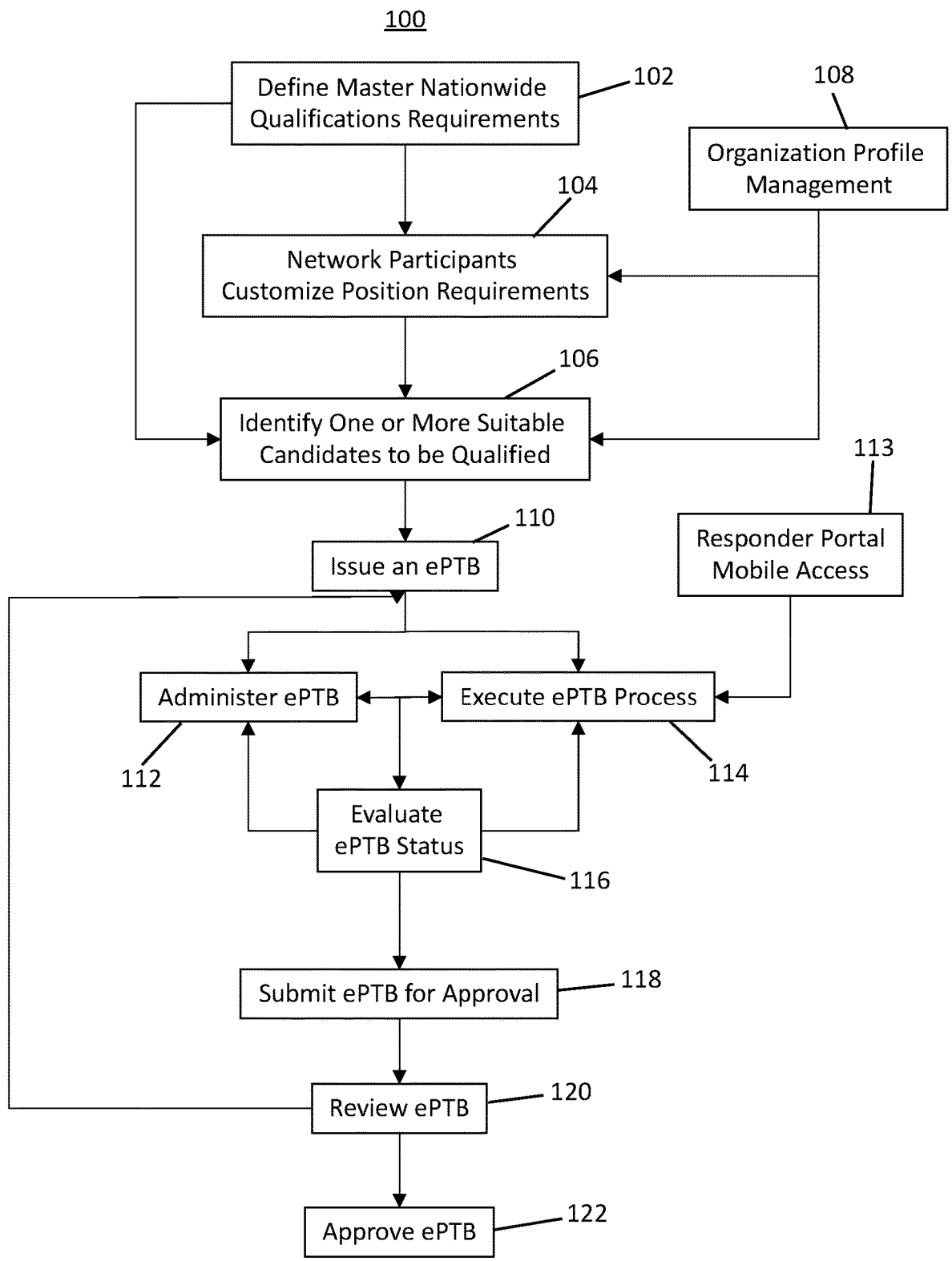
FIG. 4 is a flow chart illustrating the method as disclosed in accordance with at least one embodiment of the present invention.

Specifically, as shown in the accompanying drawings, and with particular reference to FIGS. 1 and 4, the present invention is generally directed to a system 10 and method 100 for managing the qualifications of professional personnel, e.g., emergency management personnel, for example, through the use of at least partially automated qualification management devices, referred to as electronic Position Task Books (ePTBs), administered through a network of participating organizations comprising governmental agencies, non-governmental organizations (NGOs), academic institutions, and the private sector.

For instance, with reference to the schematic or block diagram of FIG. 1, the system 10 of at least one embodiment includes a qualifications management system 20 disposed in a communicative relation with a plurality of user or participant devices 30, and a plurality of participating entity devices 40, for example, via a network 15. The network 15 may include virtually any computer, communication or data network such as the World Wide Web, Internet, Intranet, Wide Area Network(s), Telecommunication Network(s) (e.g., 3G, 4G, 5G, LTE), etc.

Moreover, the qualifications management system 20 of certain embodiments is structured to manage and/or store account or profile information associated with participant records (e.g., usernames, passwords, account information, contacts, ePTBs, qualifications, education, experiences, training, etc.) and facilitate the creation, management, transmission and/or distribution of qualification management devices or ePTBs, as described herein. For example, the qualifications management system 20 of at least one embodiment the present invention may include a web or cloud-based computer or server, desktop computer, laptop computer, tablet, mobile or handheld computer, etc. capable of facilitating implementation of the present invention disclosed herein. Particularly, it is noted that the platform/system 20 of at least one embodiment includes, among other components and devices structured to facilitate implementation of the present invention in the intended manner, a computer processor, memory, a data storage device, and communication or network device(s).

Specifically, as used herein, the processor of at least one embodiment may include any device cooperatively structured to execute or implement computer instructions, software, etc., including, for example, the various features and components as described in accordance with at least one embodiment of the present invention and configured to implement or facilitate the implementation of the method 100 herein. Further, the memory device as used herein, may include but is not limited to random access memory (RAM) or other like devices configured to implement the present invention in the intended manner, for example, by storing and assisting with the execution of one or more applications, modules, or components capable of implementing the system 10 and method 100 described herein. It should be noted that non-transitory computer readable media includes all computer-readable media except for a transitory, propagating signal. The data storage device 43, as used herein, may include a hard disk drive, USB drive, solid state drive, virtual drive, could-based storage drive, or other types of volatile or non-volatile memory. Moreover, the communication device may include a network communication hardware/software component structured to facilitate communication between the management platform/system 20 of the present invention and the various user/participant devices 30, 40.

Furthermore, the user/participant devices 30, 40 of certain embodiments or implementations of the present invention may include any mobile devices or mobile terminals such as, but not limited to mobile phones, smartphones, tablet computers, etc. (e.g., APPLE® iPHONE®, ANDROID® based phone, etc.), and/or any laptop or mobile computers, desktop computers, etc.

It is also noted that the device(s) 30, 40 of at least one embodiment includes, among other components and devices structured to facilitate implementation of the present invention in the intended manner, a computer processor, memory, a data storage device, and communication or network device(s). Moreover, as used herein, the processor of the devices 30, 40 may include any device cooperatively structured to execute or implement computer instructions, software, etc., including, for example, the various features and components as described in accordance with at least one embodiment of the present invention and configured to implement the method 100 herein. Further, the memory of devices 30, 40 as used herein, may include but is not limited to random access memory (RAM) or other like devices configured to implement the present invention in the intended manner, for example, by storing and assisting with the execution of one or more applications, modules, or components capable of implementing the system 10 and method 100 described herein. It should be noted that non-transitory computer readable media includes all computer-readable media except for a transitory, propagating signal. The data storage device, as used herein, may include a hard disk drive, USB drive, solid state drive, virtual drive, could-based storage drive, or other types of volatile or non-volatile memory. Moreover, the communication device may include a network communication hardware/software component structured to facilitate communication with the network 15.

In some cases, the device 30, 40 may have a mobile or desktop application or interface downloaded and installed or otherwise accessible thereto. The application may be specifically configured to facilitate implementation of the various embodiments disclosed herein.

Accordingly, it should be apparent that the system 10 of at least one embodiment includes or otherwise utilizes cloud-based, internet, and mobile technologies to allow a network of emergency management professionals to collaborate on the qualifications management process. One skilled in the art of managing data related to organizational qualifications management will recognize that data of at least one embodiment may be stored in a cloud-based multi-tenancy or other database or storage device 22; application files may utilize a computer server; and data may be accessed, viewed, and manipulated by devices 30, 40 such as personal computers, laptop computers, tablet computers, and/or mobile devices via an internet browser or mobile application.

Additionally, one skilled in the art of managing data related to organizational qualifications management will recognize that, in at least one embedment, data will be accessed through the network 15 such as but not limited to the internet or an intranet.

Figure 2:
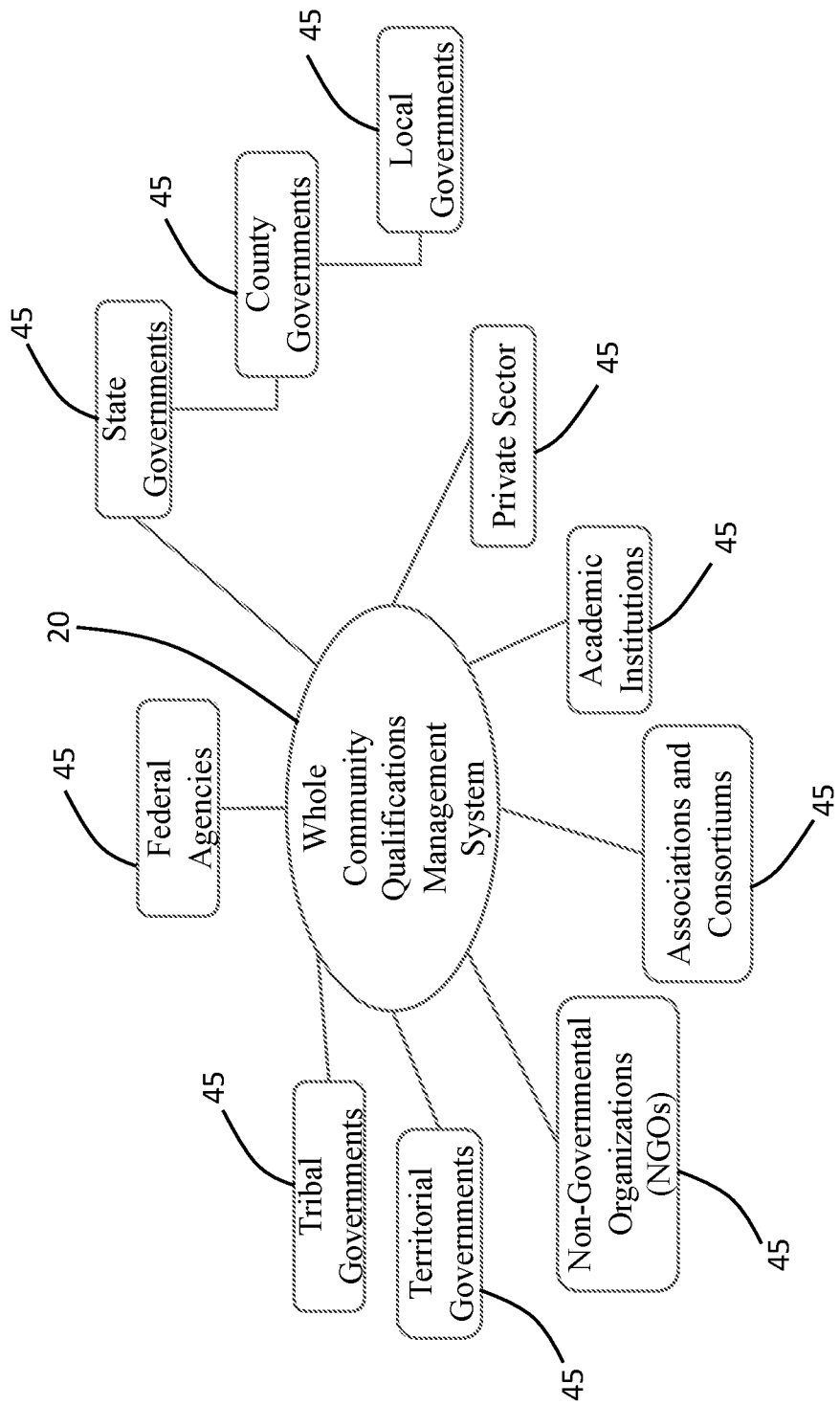
FIG. 2 is a block diagram illustrating a plurality of exemplary participating organizations or entities disclosed in communicative relation with a common or central management system.

With reference to FIG. 2, a plurality of exemplary participating entities 45 are illustrated as being communicatively linked to the management system 20 of at least one embodiment. This provides a wide ranged network, and in some cases a nationwide or global network, representing a plurality (e.g., tens of thousands) of organizations 45, as well as participating individuals or users such as emergency managers, first responders and supporting personnel. In this manner, the participating entities 45 can include, but are in no way limited to federal agencies, tribal governments, territorial governments, non-governmental organizations (NGOs) associations and consortiums, academic institutions, private sector entities, state governments, county governments, local governments, etc. Participating individuals or participants 35 may thus be virtually any emergency responder, firefighter, emergency medical technician (EMT), police officer, military personnel, etc., although other professions and employments are contemplated within the full spirit and scope of the present invention.

Figure 3A:
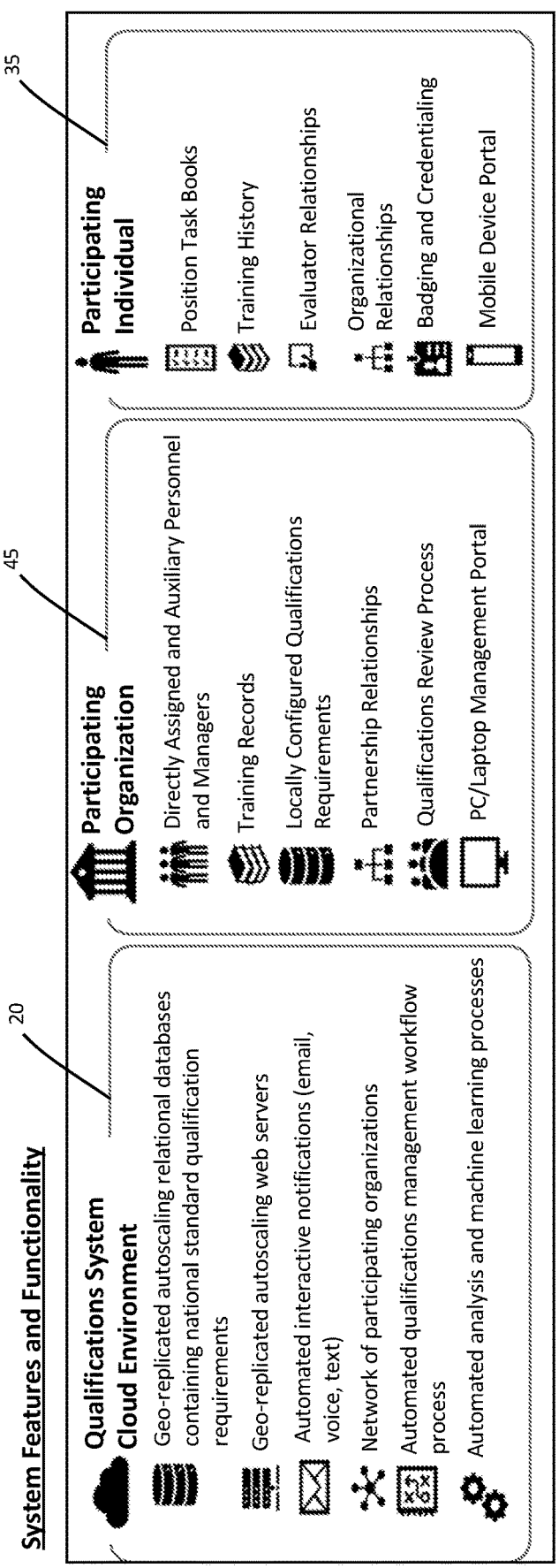
FIG. 3A is a block diagram illustrating a plurality of exemplary system features and functionality as disclosed in accordance with at least one embodiment of the present invention.
Figure 3B:
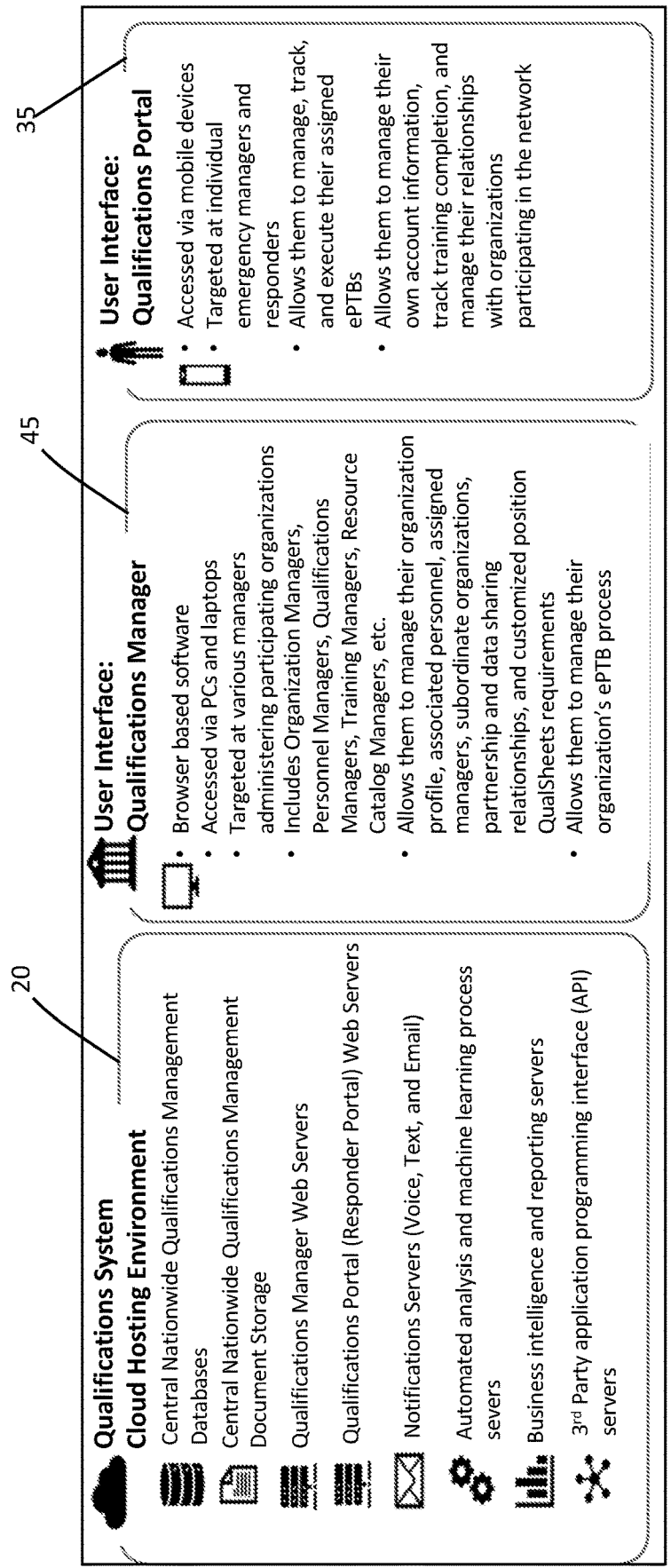
FIG. 3B is a block diagram illustrating system hosting environment and user interfaces as disclosed in accordance with at least one embodiment of the present invention.

FIGS. 3A and 3B represent and show various features and functionality of qualifications management system 20, participating organization or entity 45 and participating individual 35 of at least one embodiment of the present invention. For example, in at least one embodiment, the qualifications management system 20 include one or more databases 22 managed by one or more servers (e.g., qualifications manager web servers, responder portal web servers, automated analysis and machine learning process servers, business intelligence and reporting servers, etc.)

With reference to the flow chart illustrated in FIG. 4, the method 100 of at least one embodiment of the present invention is shown wherein a plurality of participating organizations or entities 45 are able to collaborate on the definition of qualification standards, issue ePTBs to appropriate personnel, manage the ePTB process, and review and approve ePTBs.

Block 102: Define Master Nationwide Qualifications Requirements.

Specifically, the method 100 of at least one embodiment includes defining or creating a master (e.g., nationwide or global) qualifications requirements for a plurality of individual Position Groups or Position Types. For example, in some embodiments, using the processor(s) at the qualifications management system 20, and in combination with input provided by external sources, as described herein, the method 100 may include creating a nationwide hierarchy of positions defined as including a hierarchically constructed system whereby emergency personnel (and other) positions are defined.

Figure 6A:
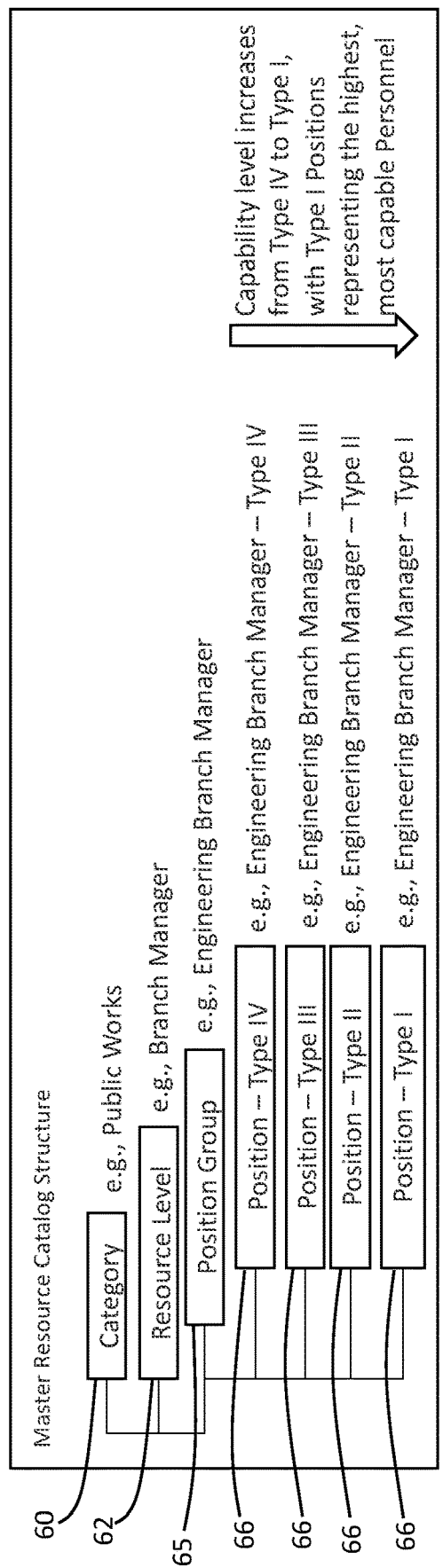
FIG. 6A is a block diagram illustrating an exemplary hierarchal catalog structure for nationwide positions as disclosed in accordance with at least one embodiment herein.

FIG. 6A represents an exemplary relational or hierarchal flow diagram illustrating the relation between certain levels (e.g., Categories, Resource Level, Position Group, and Position Type), as used in accordance with the nationwide hierarchy of positions of at least one embodiment herein.

For example, an individual Position Group 65, as used herein, is a term or classification defining a group of positions for the individual participants 35. For example, an individual Position Group can be an "Operations Branch Manager," "Engineering Branch Manager," or other grouping. The individual Position Groups can be organized into separate higher hierarchical classifications such as Categories 60, e.g., "Emergency Medical Services," "Search and Rescue," or "Public Works"). Position Groups may also be categorized by an ICS Resource Level 62, indicating different types of "Incident Command System" (ICS) responsibilities (e.g., Section Chief, Branch Manager, Group Supervisor, etc.) spanning multiple Categories and Position Groups. Position Groups 65 are then further divided into various Types 66 of positions (e.g., "Operations Branch Manager—Type II"), where these Types of Positions define increasing capabilities of a qualified individual to handle more complex disaster management duties along a scale of Type IV to Type I, with Type I positions being considered the highest level, or most capable, positions.

Figure 5:
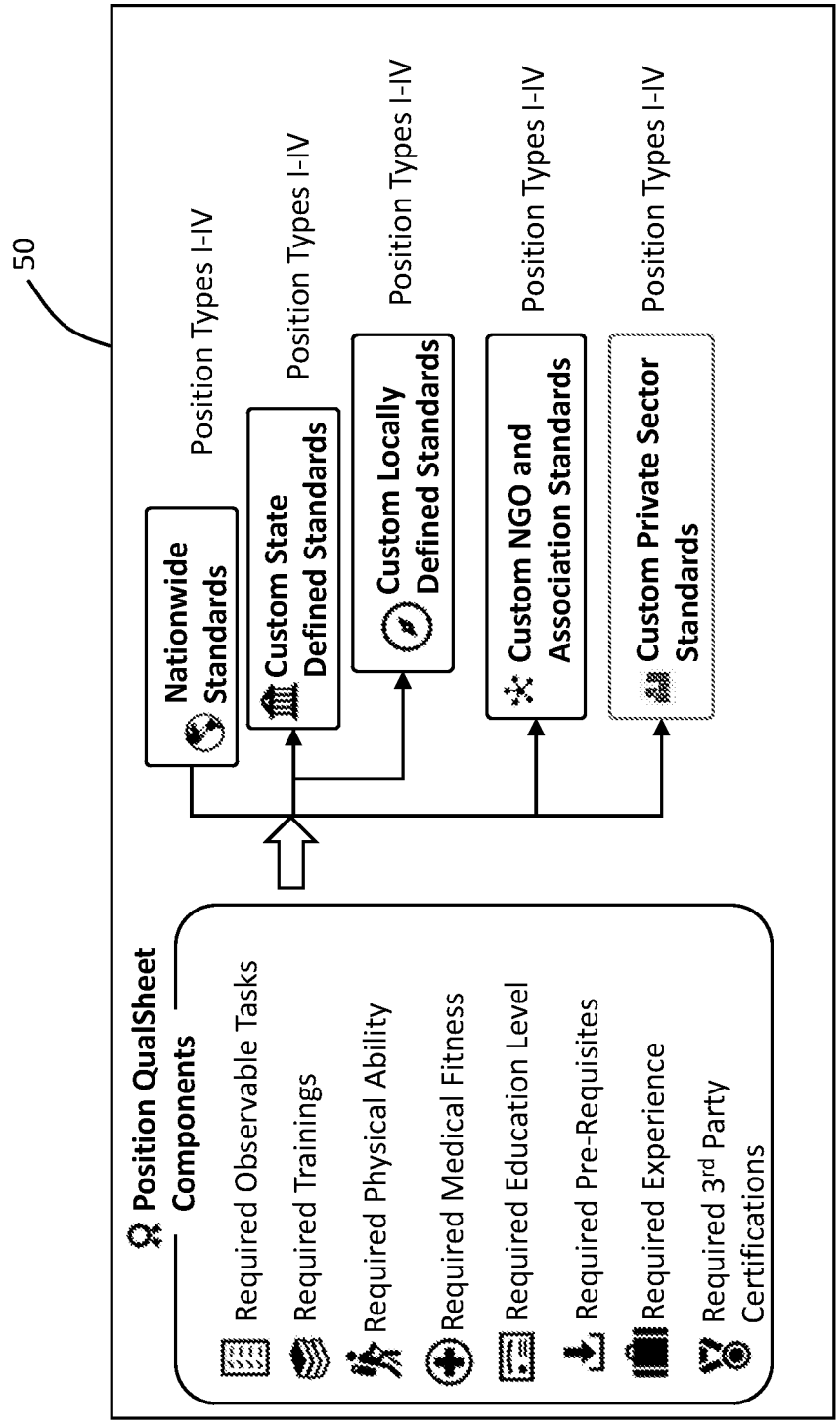
FIG. 5 is a block diagram illustrating an exemplary Position Qualification Sheet and the components thereof as disclosed in accordance with at least one embodiment of the present invention.

In this manner, once the position hierarchy is created or defined, an authorized administrator, for example, of the qualifications management system 20, may define various qualification requirements collectively referred to as or otherwise stored as a Qualifications Sheet or QualSheet 50. In particular, with reference to FIGS. 5, 6B and 6C, a QualSheet or Qualifications Sheet 50 of at least one embodiment is a data set or set of information stored at the qualifications management system 20 that defines a plurality of qualification (and possibly other) requirements that an individual must complete or satisfy in order to be considered fully qualified to act in the capacity of the given or corresponding position (e.g., a Position Group or a Position Type.) For instance, each Qualifications Sheet 50 includes a list or set of items or requirements an individual can demonstrate he/she has done (e.g., trainings, years of experience, etc.) and actions that have been or can be witnessed and endorsed by an authorized Evaluator, as described again below.

In at least one embodiment, for each of the positions defined or created by the hierarchy of personnel positions, a Qualifications Sheet 50 is created, thereby defining the minimum requirements for each defined position. A Qualifications Sheet 50 may, however, be assigned to or defined at the Category level 60, Resource Level 62, Position Group 65, and/or individual Position Type level 66. Furthermore, the Qualification Sheets 50 may be defined at multiple levels and cascade from lower to higher levels in the hierarchy of specificity and capability. For example, an "Engineering Branch Manager—Type II" would need to fulfill all of the requirements set forth on the Qualifications Sheet 50 of Branch Managers (e.g., at the Resource Level), Engineering Branch Managers (e.g., at the Position Group level), Engineering Branch Manager—Type II (e.g., Position Type level 66), and in some cases, any preceding position defined in the Position Type level, such as Engineering Branch Manager—Type IV and Engineering Branch Manager—Type III.

Figure 6B:
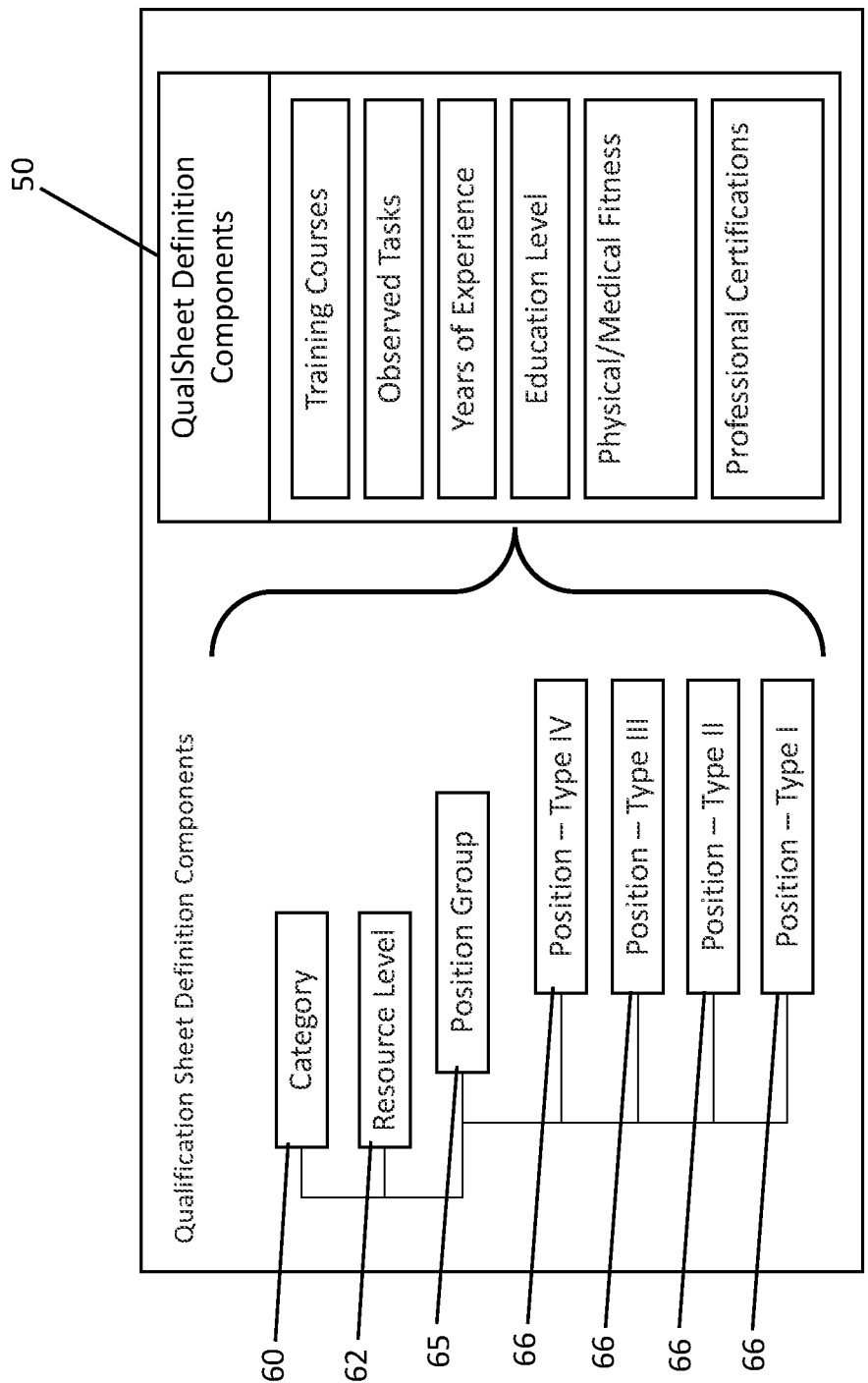
FIG. 6B is a block diagram illustrating exemplary Qualification Sheet definition components as disclosed in accordance with at least one embodiment herein.
Figure 6C:
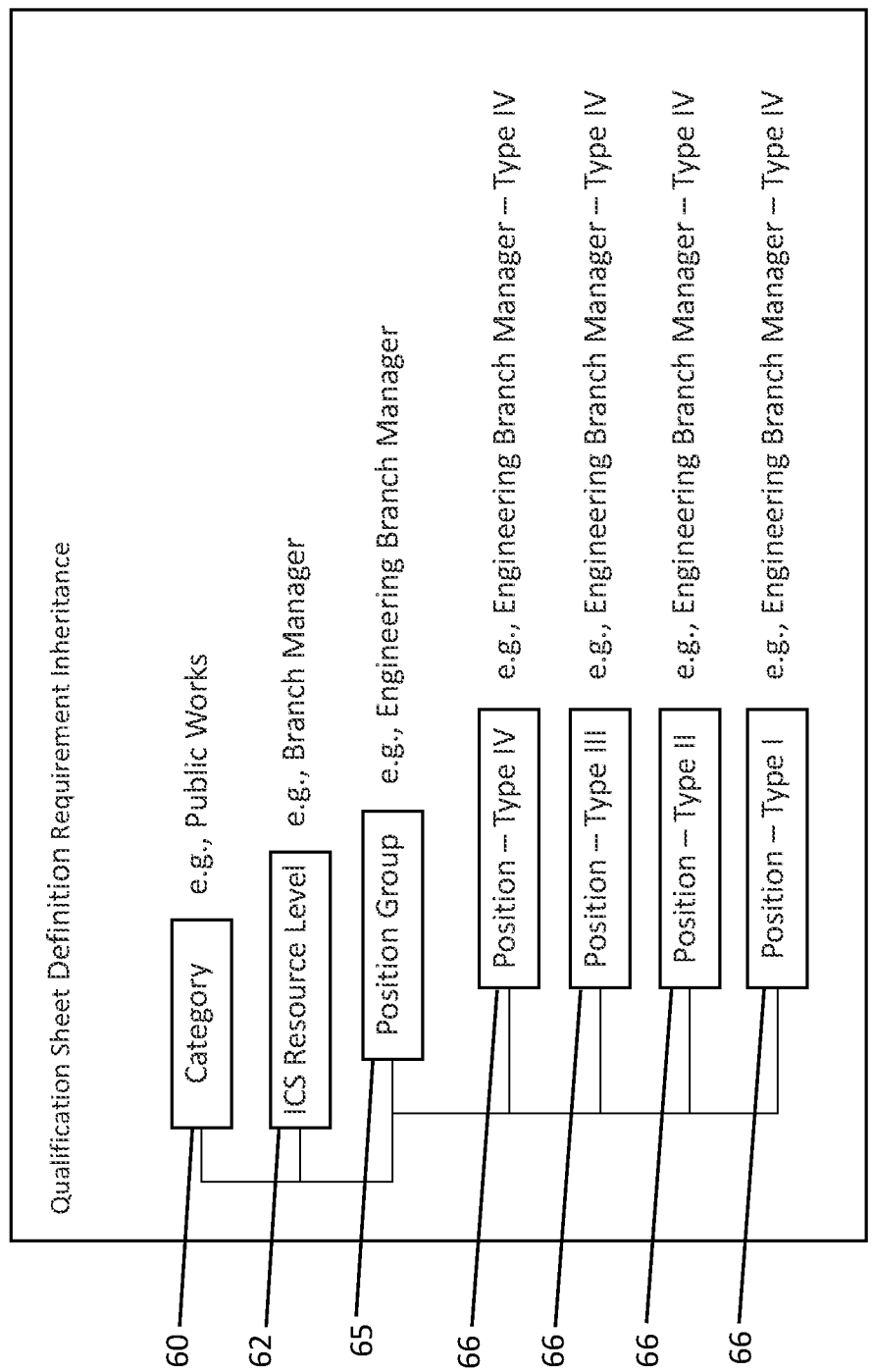
FIG. 6C is a block diagram illustrating exemplary Position Qualification Sheet inheritance as disclosed in accordance with at least one embodiment herein.

With reference to FIG. 6B, the Qualifications Sheet 50 of at least one embodiment may include some or all of the following requirements: training courses; observed or observable tasks/activities, experience, 3rd party certifications; education attainment or level, physical/medical fitness, professional or mission area experience or certifications, pre-requisite positions, etc. Again, in at least one embodiment, Qualifications Sheets 50 are hierarchical and additive, meaning that an Operations Branch Manager—Type II would need to fulfill any general Operations Branch Manager requirements, as well as any explicitly defined for the Type III or Type IV variants, as applicable.

Further, as described below with reference to Block 104 (Network Participants Customize Position Requirements), additional requirements may be defined at further (lower or local) hierarchical levels (e.g., State Government→County Government→Local Government→Local Fire Department). As described below with reference to 110 (Issue an ePTB), in at least one embodiment, the method 100 of the present invention will generate consolidated Qualification Sheets that automatically inherit all qualification requirements defined by Qualification Sheets at one or more previous or higher national or local hierarchal level(s). For example, an ePTB for a local position would automatically inherit the requirements for the corresponding (higher) national position (defined by the master nationwide qualifications requirements or hierarchy 102) as well as any requirements for the local position (defined by the network participants who customize the position requirements 104).

As an example, a Dade County Fla. Medical Unit Leader—Type III ePTB would be automatically generated including all of the following cascading requirements: (1) Nationally defined Unit Leader requirements (e.g., as defined by the Qualifications Sheets 50 associated with nationally-defined "Unit Leader" at the Category 60 or Resource 62 level), (2) Nationally defined Medical Unit Leader requirements (e.g., as defined by the Qualifications Sheet 50 associated with the nationally-defined "Medical Unit Leader" at the Position Group 65 level), (3) Nationally defined Medical Unit Leader—Type IV requirements (e.g., as defined by the Qualifications Sheet 50 associated with the nationally-defined Position Type IV level 66), (4) Nationally defined Medical Unit Leader—Type III requirements (e.g., as defined by the Qualifications Sheets 50 associated with the nationally-defined Position Type III level 66), (5) State of Florida defined Medical Unit—Type IV requirements (e.g., as defined by the Qualifications Sheet 50 associated with the locally-defined, e.g., State of Florida, Position Type level,) (6) State of Florida defined Medical Unit—Type III requirements (e.g., as defined by the Qualifications Sheet 50 associated with the locally-defined, e.g., State of Florida, Position Type level,) (7) Miami-Dade County, Fla. defined Medical Unit—Type IV requirements (e.g., as defined by the Qualifications Sheet 50 associated with the locally-defined, e.g., Miami-Dade County, Position Type level,) and (8) Miami-Dade County, Fla. defined Medical Unit—Type III requirements (e.g., as defined by the Qualifications Sheet 50 associated with the locally-defined, e.g., Miami-Dade County, Position Type level.)

Figure 6D:
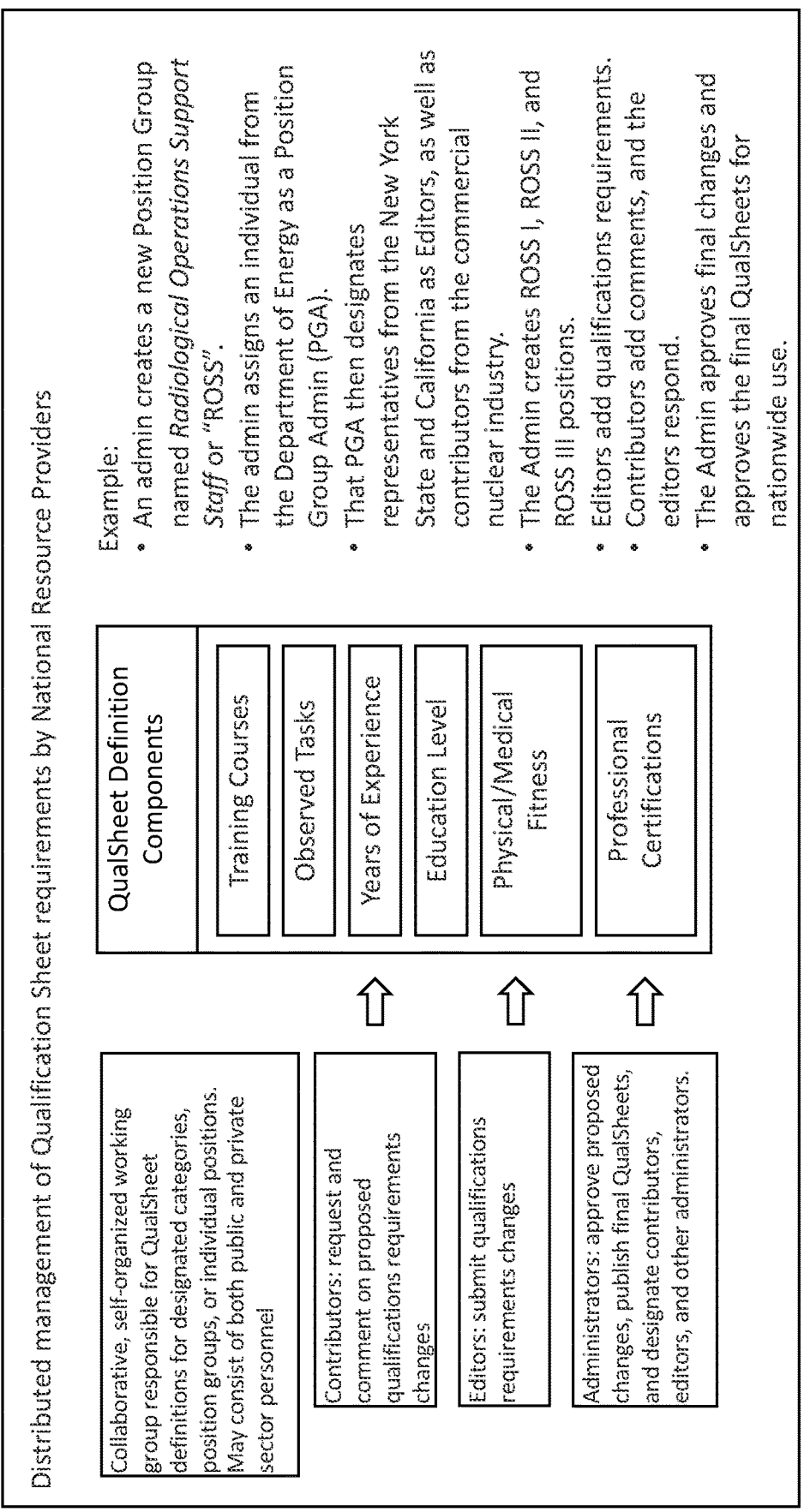
FIG. 6D is a block diagram illustrating the distributed management of Qualification Sheet requirements as disclosed in accordance with at least one embodiment herein.

With reference to FIG. 6D, in at least one embodiment of the present invention, the method 100 provides a collaborative workflow mechanism designed to allow a diverse group of network participants or individuals to function as Subject Matter Experts (SMEs), granting them the ability to contribute to Qualification Sheet 50 requirement definitions. This allows the organizations 45 to contribute to the development of nationally-defined standards, acting as National Resource Providers or "NRPs". For instance, a consortium of organizations involved in CBRN (i.e., Chem/Bio/Rad/Nuc) emergency response can use the system to define highly technical qualifications requirements for a "Radiological Operations Support Staff", or "ROSS" position. This allows a collection of "contributors", "editors", and "administrators" to, respectively: comment on proposed qualification requirement changes; submit proposed changes; and approve and publish changes to the official Qualification Sheet for use nationwide. This process is generic for any type of qualifications requirements process. In this manner, the system supports the distributed management of minimum nationwide qualification requirements by SMEs who are recognized experts in their fields.

Block 104: Network Participants Customize Position Requirements

With reference to block 104 in FIG. 4, the method 100 of at least one embodiment allows an organization to customize a position's Qualification Sheet 50 requirements based on the organization's local needs and requirements, extending or adding to the baseline national standards described with reference to Block 102. These include all requirement types defined above: training courses; 3rd party certifications; education attainment; physical/medical fitness; professional or mission area experience, etc. As with the Qualification Sheets 50 described above with reference to the nationally-defined levels 60, 52, 65, 66, the local requirements are hierarchical and additive.

Specifically, the individual organizations 45 will first define a set (e.g., hierarchy or list) of local positions that are linked to or associated with the national positions described above. For example, in some cases, an administrator or agent of one or more of the local organizations 45 can use an interface 40 to define or add local positions to the database 22 at the qualifications management system 20. In doing so, the local position(s) may be linked to or associated with the national positions, for example, for purposes of being able to inherit national qualification reaurements set forth in the corresponding national Qualifications Sheets 50 described above.

Figure 7:
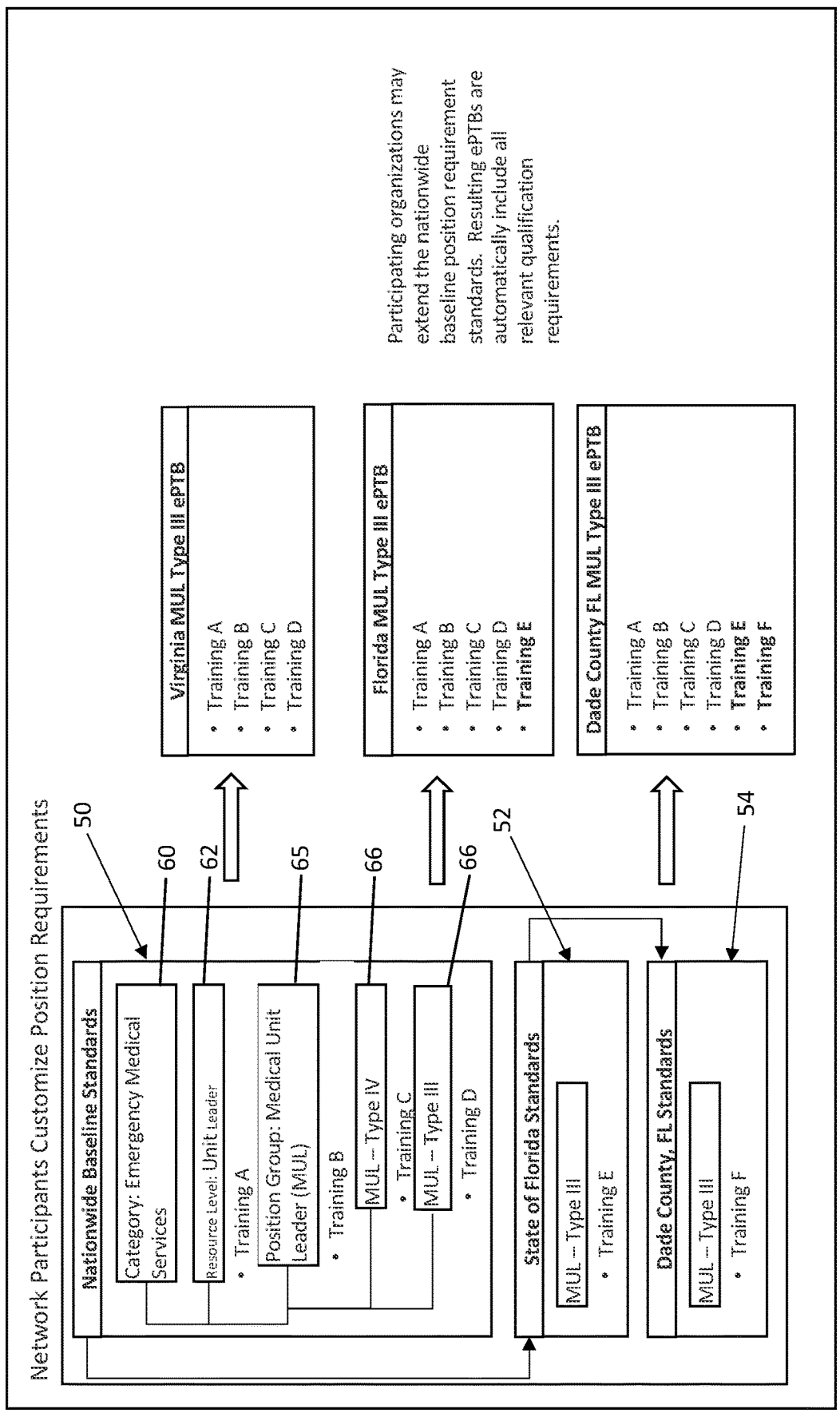
FIG. 7 is a block diagram illustrating customized position requirements provided by network participants (e.g., participating organizations or entities) as disclosed in accordance with at least one embodiment of the present invention.

For instance, with reference to the example shown in FIG. 7, (e.g., using the Medical Unit Leader (MUL) example), as defined by the national Qualifications Sheet 50, nationwide baseline standard qualification requirements may include: (1) Nationwide Unit Leader requirements: requires Training A, (2) Nationwide MUL Position Group requirements: requires Training B, (3) Nationwide MUL Type IV Position requirements: requires Training C, and (4) Nationwide MUL Type III Position requirements: requires Training D.

Furthermore, a local (e.g., state) entity may then further define, extend or add to the higher hierarchal requirements, such as the national requirements, for example, via a local (e.g., state) Qualification Sheet, referenced as 52, e.g., for the local position. For instance, the State of Florida may extend the above-referenced national requirements such that Florida MUL Type III: requires Training E.

Additionally, other local (e.g., county) entities may even further extend or add to the higher hierarchal requirements, such as the national and state requirements, for example, via a local (e.g., county) Qualifications Sheet, referenced as 54. For instance, Miami-Dade County, Fla. may then extend these requirements such that Miami-Dade County Fla. MUL Type III: requires Training F.

Accordingly, as described below in connection with Block 110 (Issue an ePTB), when Miami-Dade County, Fla. issues a Medical Unit Leader—Type III ePTB to one of their Personnel or individual participants, the following trainings will be required: A, B, C, D, E, and F. Similarly, if the State of Florida were to issue an ePTB, it would not include "Training F", which is only required by Miami-Dade County, Fla.; e.g. trainings A, B, C, D, and E.

Block 106: Identify Suitable Candidates to be Qualified

Once an organization or participating entity 45 has finalized the Qualification Sheet requirements for their local position catalog (104), and configured their organization's profile (108), the system 10, method 100 or entity 45 can then identify suitable candidates to be considered for qualification. These candidates may be drawn from a defined pool of candidates, such as, but not limited to all participants, participants associated with their own Organization 45, or participants associated with one or more hierarchically or directly/indirectly related Organizations, which is particularly useful in disaster relief situations, for example.

In particular, in at least one embodiment, an administrator or agent of an organization 45 can access the system 10 or method 100, for example, via an interface communicative with the qualifications management system 20, and submit a request to identify one or more candidates 35 available for an identified position. For instance, the agent or administrator may, in some cases, select or identify a position (e.g., a local position or a national position) previously defined and indicate (e.g., via an interface selection) that he/she would like the system 10 or method 100 to assist in the identification of one or more candidates for the position. In such a case, the system 10 or method 100 will automatically perform an analysis to aid the Organization 45 in identifying the best candidates, as referenced at 106 in FIG. 4.

For example, the system 10 or method 100 of at least one embodiment is configured to scan user data (e.g., qualification data) or participant records and profiles retained or stored in the qualifications management system 20 in order to automatically determine which one or more individual participants 35 are qualified or best qualified for a defined or selected position. The analysis may be based upon a number of factors including, but not limited to: whether the candidate or participant has completed defined pre-requisites; whether the candidate or participant has been previously awarded training credit; whether the candidate or participant has previously completed certain tasks; whether the candidate or participant has previously completed ePTBs of the same or related position issued from another network participant, etc.

In some instances, as just an example, the system 10 or method 100 may support the concept of an individual participant being qualified as an OBM Type II (using the example above) by the State of Virginia, and being subsequently qualified by Miami-Dade County, Fla. as an OBM Type II. In this case, the candidate would be automatically credited with having already completed the nationwide OMB Type II requirements, meaning that they may already be considered 90% qualified as a Miami-Dade County, Fla. OMB—Type II. This will assist participating organizations to identify the best possible candidates that can be qualified for the lowest investment in terms of cost and time.

Block 108: Organization Profile Management

The system 10 and method 100 of at least one embodiment allows for the self-management of organizational profiles, as represented at 108, by network participants or participating entities 45. As an example, organizations or various participating entities 45 may be related to each other in a number of ways including, but not limited to hierarchal relationships 108A, partnership relationships 108B, private sector relationships 108C, and multimember association relationships 108D.

For instance, hierarchical relationships 108A can be defined as having multi-level or parent-child type associations such as: State of Florida-Miami-Dade County, Fla.→City of Miami Fla.→Miami Public Safety Department→Miami Fire Department. All Organizations except the root (e.g., OneResponder) organization itself will have a parent organization, organizing sets of organizations into "trees" which have implications for system roles and data access privileges.

Partnership relationships 108B can be used to grant data access and other privileges between organizations which may not otherwise be able to access each other; for example, two adjacent counties which fall within different states.

Association relationships 108D can be used to allow groups or organizations to share data and interoperate without requiring all of them to form individual partnerships.

Figure 8A:
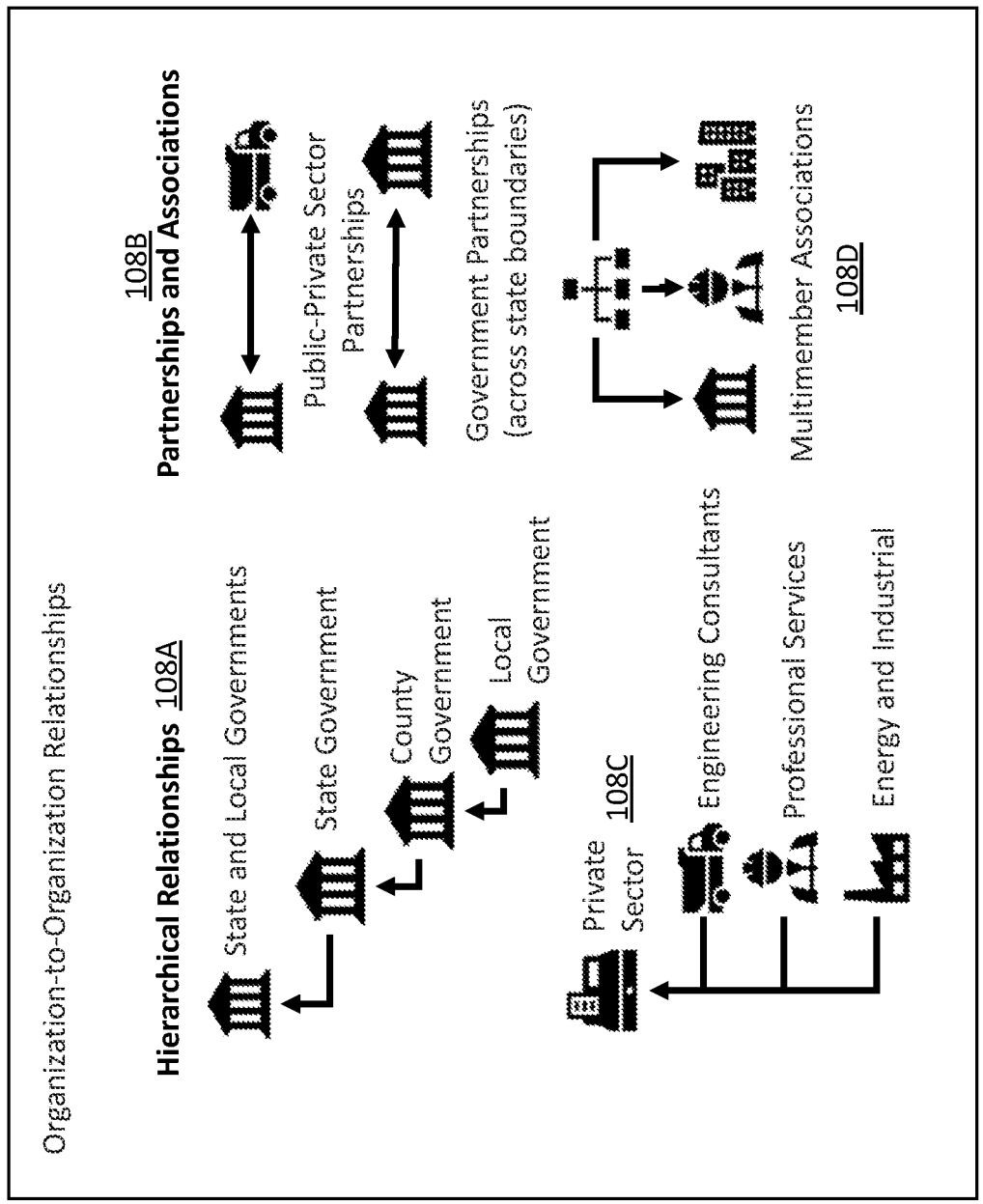
FIG. 8A is a relational diagram illustrating a plurality of exemplary organization-to-organization relationships available in accordance with at least one embodiment of the present invention.
Figure 8B:
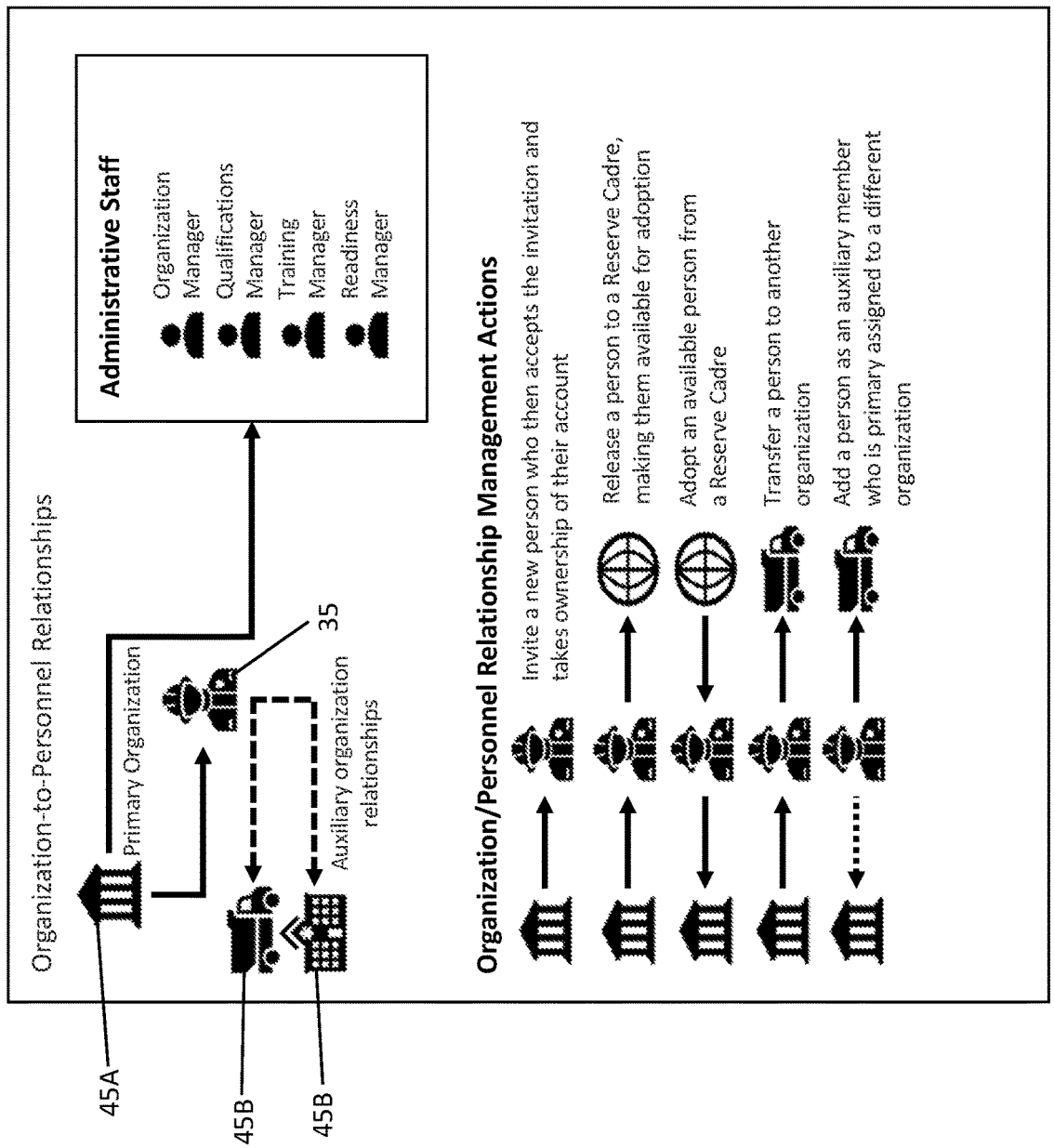
FIG. 8B is a relational diagram illustrating a plurality of organization-to-personnel relationships available in accordance with at least one embodiment of the present invention.

Furthermore, with reference to FIG. 8B, individual personnel or participants 35 may also be associated with organizations 45 in a number of ways. For instance, in at least one embodiment, all individuals or participants 35 will have one-and-only-one primary organization 45A. If released from their primary organization 45A, an individual participant 35 will automatically be assigned to their home states' "reserve cadre" organization.

Moreover, in at least one embodiment, an individual participant 35 may be associated with zero-or-more auxiliary organizations 45B. For instance, a firefighter with a primary organization 45A of the Miami, Fla. Fire Department could also be affiliated with a local EMT provider and an NGO like the Red Cross.

In some cases, organizations 45 will also typically have one or more assigned administrative staff; e.g., Organization Managers, Qualifications Managers, Training Managers, Readiness Managers, etc. These role assignments grant the respective individuals over data associated with the organization and, conditionally, the data of hierarchically subordinate organizations, partner organizations, and association members. An individual may be assigned no administrative roles, be assigned administrative roles in a single organization, or assigned administrative roles in multiple organizations.

Administrative staff may perform a number of operations on various organizational data sets including: Personnel who are directly assigned to the Organization as their Primary identity (e.g., employees) managed via the Account Invitation process.

Auxiliary Personnel associated with the Organization (e.g., volunteers and association members) managed via the Personnel Adoption process.

Subordinate Organizations (e.g., Virginia→Fairfax County, Va.→Town of Vienna→Town of Vienna Fire Department)

Locally defined position Qualification Sheet requirements

Relationships with external organizations (e.g., direct Partnership and Association Memberships)

Data sharing rules governing relationships with hierarchically associated and external organizations An authorized organizational user may perform the following administrative operations on their organization's personnel:

Invite new personnel via a utility that sends out email invitations which allows the targeted personnel to "take ownership of" and activate their account. The process may be executed individually or in bulk. During this process, the targeted personnel will: specify their desired username and password; set an account reset question and answer; and add additional contact mechanisms (e.g., emails).

Release personnel from their organization. In at least one embodiment, personnel records or profiles are never deleted and are not considered to be "owned" by the organization 45 that originally invited them. Instead, personnel 35 who are no longer actively associated with their primary organization 45A may be "released", whereby they are automatically assigned to a default group, such as, the "reserve cadre" of their home state. For instance, an individual who worked for the Fairfax County, Va. Emergency Management Office could, upon retirement or termination of their employment, be released and thereby automatically assigned to the Virginia Reserve Cadre. In this manner a personnel's qualifications history is never deleted, they maintain control of their profile, and it can be maintained throughout their career.

Adopt personnel from a default group or Reserve Cadre. In at least one embodiment, a personnel record or profile is never deleted from an organization, but is instead released to a default group, such as the personnel's home state's reserve cadre. In this manner, the system 10 and method 100 of the present invention is configured to have the ability for a personnel record or profile and its associated qualifications history to be consistently maintained throughout an individual's career no matter how many times they have changed employment. In some cases, the adoption process requires the targeted individual to approve the adoption.

Transfer personnel between organization. Similar to the release and adoption, the transfer process allows a personnel's 35 primary organization 45A to be changed. The transferring organization uses the system to send a workflow request to the target organization. Upon acceptance, the personnel record is transferred from the requesting organization to the target organization.

Update account and contact information.

Block 110: Issue a Qualification Management Device or an ePTB

Figure 9:
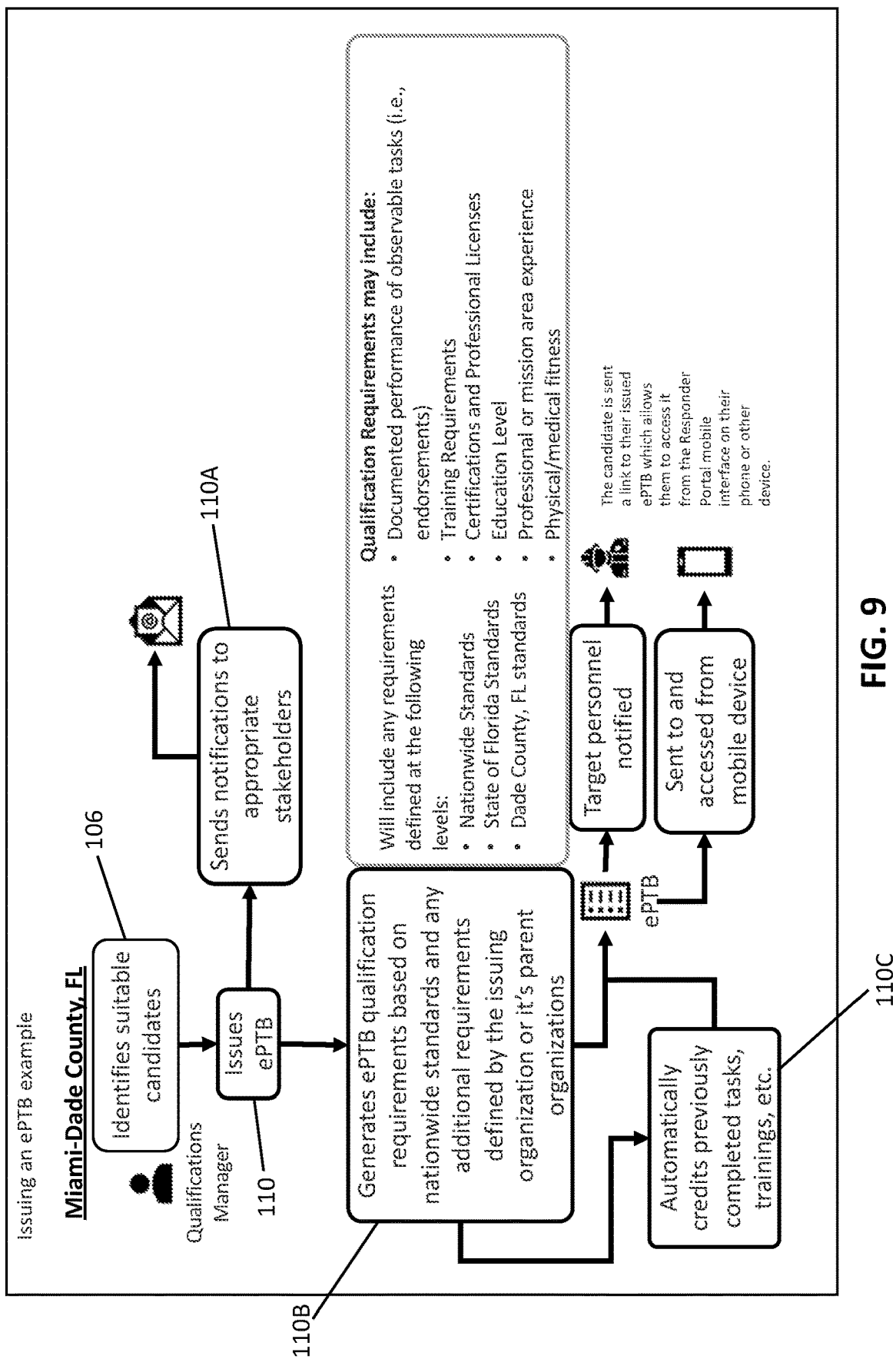
FIG. 9 is a relational and block diagram illustrating an example of issuing an ePTB in accordance with at least one embodiment of the present invention.

With reference to Block 110 in FIG. 4 and the block diagram of FIG. 9, once a suitable candidate or candidates are identified (for example, as provided in Block 106), the system 10 or method 100, or in some cases an authorized administrator user, can initiate the issuance of an ePTB to any one or more of the identified candidates or participants 35.

For instance, the system 10 or method 100 of at least one embodiment is configured to automatically notify all relevant participants 35 in the ePTB issuance process 110A, including for example the candidate themselves, the personnel issuing the ePTB, and in some cases their relevant or respective supervisors (e.g., the issuing organization's qualifications manager and training manager, or the candidate's supervisor(s)).

As referenced at 110B, this will result in the ad hoc generation of an ePTB 200 appropriate to the candidate customized to them with respect to: their organization's custom requirements; any relevant associated requirements (e.g., from their parent County or State) from other organizations; and nationwide requirements. For example, an ePTB 200 is an electronic record or a set of electronic data and information that includes, among other items, an identification of all qualification requirements defined by the Qualifications Sheet(s) 50, 52, 54 associated with the corresponding position, as well as, in some cases, administrative data 202, summary statistics, a status of completion of each of the requirements, etc. For example, the ePTB 200 will include an identification of requirements defined by the Qualification Sheets at the national level and if application local level(s). The qualification requirements may include, for example, required performance of observable tasks (e.g., endorsements), training requirements, certifications and professional licenses, required educational level(s), professional or mission area experience(s), physical fitness, medical fitness, etc.

The electronic ePTB record of at least one embodiment will also include an indication as to whether the participant 35 has completed or met any of the ePTB requirements. For instance, as shown at 110C, the participant 35 will automatically be credited for any previously completed tasks, PTBs, ePTBs and trainings. In this manner, for instance, an individual or participant 35 who has already completed the qualifications for a given Position for the State of Florida would only need to complete a smaller set of qualifications for the same Position's ePTB issued by Miami-Dade County, Fla. This consolidated, customized ePTB will be stored in the master database 22. The candidate's 35 notification will include a link to their ePTB which they can then view and begin execution on via their account, for example, in a Responder Portal mobile device user interface or other interface or application. Their relevant or respective supervisors, if any, (e.g., their designated Qualifications Manager and/or Training Manager) will, in some embodiments, also receive a link to the manage the ePTB via their account in the Organization Manager browse based user interface.

Once the ePTB has been issued and provisioned in the master database and all relevant parties have been notified as described above, the management of the ePTB can commence.

Block 112: Administer ePTB

After an organization or participating entity 45 or the system 10/method 100 of the present invention has identified suitable candidates, the organization or participating entity 45 may have the option of creating a new ePTB and assigning it to a target individual or participant 35. The resulting ePTB will automatically be constructed or generated to include all defined nationwide qualifications requirements (e.g., Block 102) as well as any additional qualifications requirements specified by the organization itself or its parent organizations (e.g., Block 104). An authorized organizational user may then perform a series of support and management actions on the ePTB With reference now to FIG. 10, the structure of an exemplary ePTB 200 is illustrated. For instance, an ePTB 200 is assigned to a target individual, and will permanently record various administrative data 202, e.g., an identification of the candidate or target participant, an identification of who assigned or created the ePTB and when the ePTB was assigned or created, an identification of the assigning organization, and a current status of the ePTB (e.g., whether the ePTB is issued, submitted for review, under review, approved, denied, cancelled, etc.).

The ePTB 200 of at least one embodiment will contain an identification or record of the qualification requirements 210 associated therewith. In some embodiments, the ePTB may include two or more types of qualification requirements: "certifiable activities" 212 and "observed activities" 214. Certifiable activities 212 are documentable achievements which are associated with the assigned individual's personnel record; e.g., training completion records, educational attainment, professional certifications, etc. These items will typically be confirmed and documented by a training manager, a qualifications manager, or other authorized organization user. Certifiable activities 214 are, in many cases, only be confirmed once and can then be applied to any subsequent ePTB 200. Observed activities are items that the assigned personnel performs or which they can document or demonstrate; e.g., specific observable tasks, physical or medical fitness, documented professional experience, etc. For instance, a given ePTB 200 for a Medical Unit Leader—Type II might require that the candidate:

Demonstrates that he/she knows what supplies need to be kept on hand.

Demonstrates that he/she knows how to obtain the required supplies.

Demonstrates that he/she knows how to properly store the required supplies.

Confirms that that he/she is capable of working on his/her feet in an austere environment for up to 12 hours a day or for 60 hours over a 7-day period.

And can document that he/she has worked in a public or private sector medical environment with hands-on patient experience for at least three years within the past seven years.

It should be noted that the example above, while realistic, is highly abbreviated. A typical ePTB 200 may include 3-10 required trainings and 10-50 observable tasks, and may also include a mixture of required educational achievement (e.g., a bachelor's degree in engineering), a professional certification (e.g., a professional engineer's certificate [PE]), and a required number of years of professional or equivalent experience which can be documented.

Observable activities 214 are endorsed by an authorized "evaluator" 48. Evaluators 48 may be assigned or matched to the candidate's ePTB 200, or (if permitted by the issuing organization) they may be directly requested by the candidate. For example, in some embodiments, the system 10 or method 100 will match an authorized evaluator 48 with the candidate 35 or with the ePTB associated with the candidate. Specifically, an evaluator 48 must be authorized to act as an evaluator for the identified or corresponding position. As an example, the evaluator 48 must have established credentials, training, experience, or otherwise must have satisfied prerequisites to become an evaluator for a particular position. In other words, in some embodiments, an evaluator authorized for one position may not be qualified or authorized to be an evaluator for another, different position.

In this manner, the system 10 and method 100 of at least one embodiment is structured to store or log evaluator credentials in a manner such that when an evaluator is subsequently needed, the system 10 or method 100 is able to quickly and in some cases automatically review or scan potential evaluator credentials in order to appropriately match an evaluator with a candidate or ePTB.

As mentioned above, in some cases, the system 10 and method 100 may be configured to allow a candidate to request a particular evaluator 48. In either case, the evaluator 48 will confirm that they are willing to function as the candidate's evaluator 48.

In this manner, the system 10 and method 100 of at least one embodiment is structured to provide an electronic mechanism that is configured to manage candidate-evaluator relationships. This ensures that evaluators are authorized, for example by electronically capturing endorsements, and are able to audit granted endorsements. This replaces the physical Position Task Books which are characterized by a number of problems including: lost or damaged task books; endorsements being granted by unauthorized evaluators; illegible signatures which cannot be easily independently verified; and a lack of transparency and auditability leading to nepotistic, discriminatory, and other "good old boy network" abuses.

Figure 10:
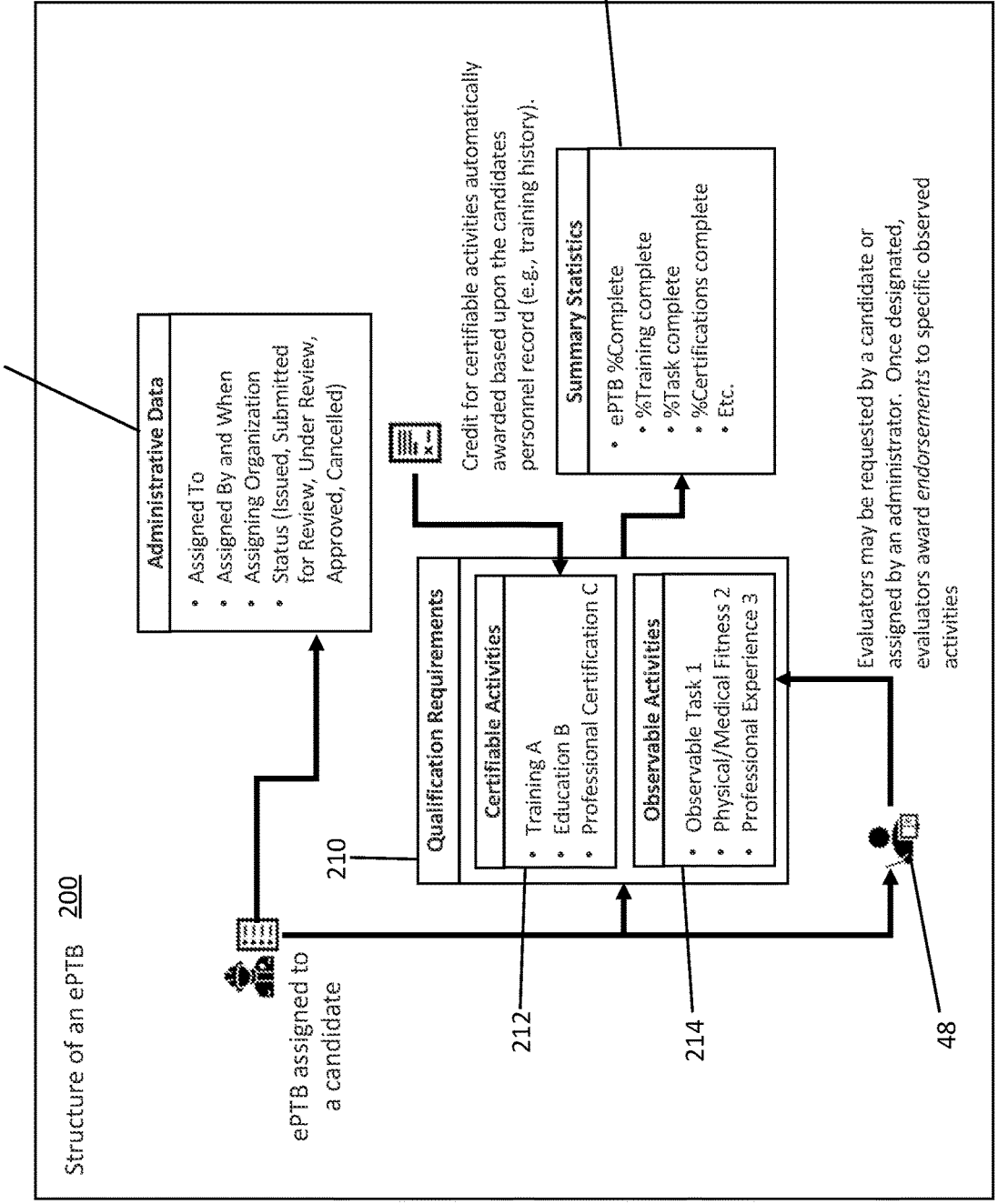
FIG. 10 is a relational and block diagram illustrating the structure of an exemplary ePTB as disclosed in accordance with at least one embodiment of the present invention.

Still referring to FIG. 10, in at least one embodiment the ePTB 200 may also include summary statistics, generally represented as 220. As an example, the summary statistics can be used to identify or track the percentage or amount of completion (e.g., how many of the requirements have already been fulfilled), percentage or amount of training that has been completed, percentage or amount of tasks that have been completed, percentage or amount of certifications that have been completed, etc.

Furthermore, authorized administrators may perform a number of activities to assist candidates and evaluators including: issuing, closing, re-issuing, or canceling an ePTB; manually awarding or removing endorsements; e.g., in the case where an evaluator either awarded endorsements inadvertently or had accessibility or technical challenges using the system to award and endorsement; assigning or removing authorized evaluators. In certain embodiments, any action taken by an authorized administrator will be permanently recorded in action logs.

Block 114: Execute ePTB Process

Once an ePTB 200 has been issued to a candidate, a combination of nationally-defined and locally-customized requirements will be used to generate an ePTB 200 specific to that candidate 35. While an authorized administrator may provide assistance, the ePTB 200 is more commonly processed by direct interaction between the candidate 35 and their evaluators 48.

Figure 11:
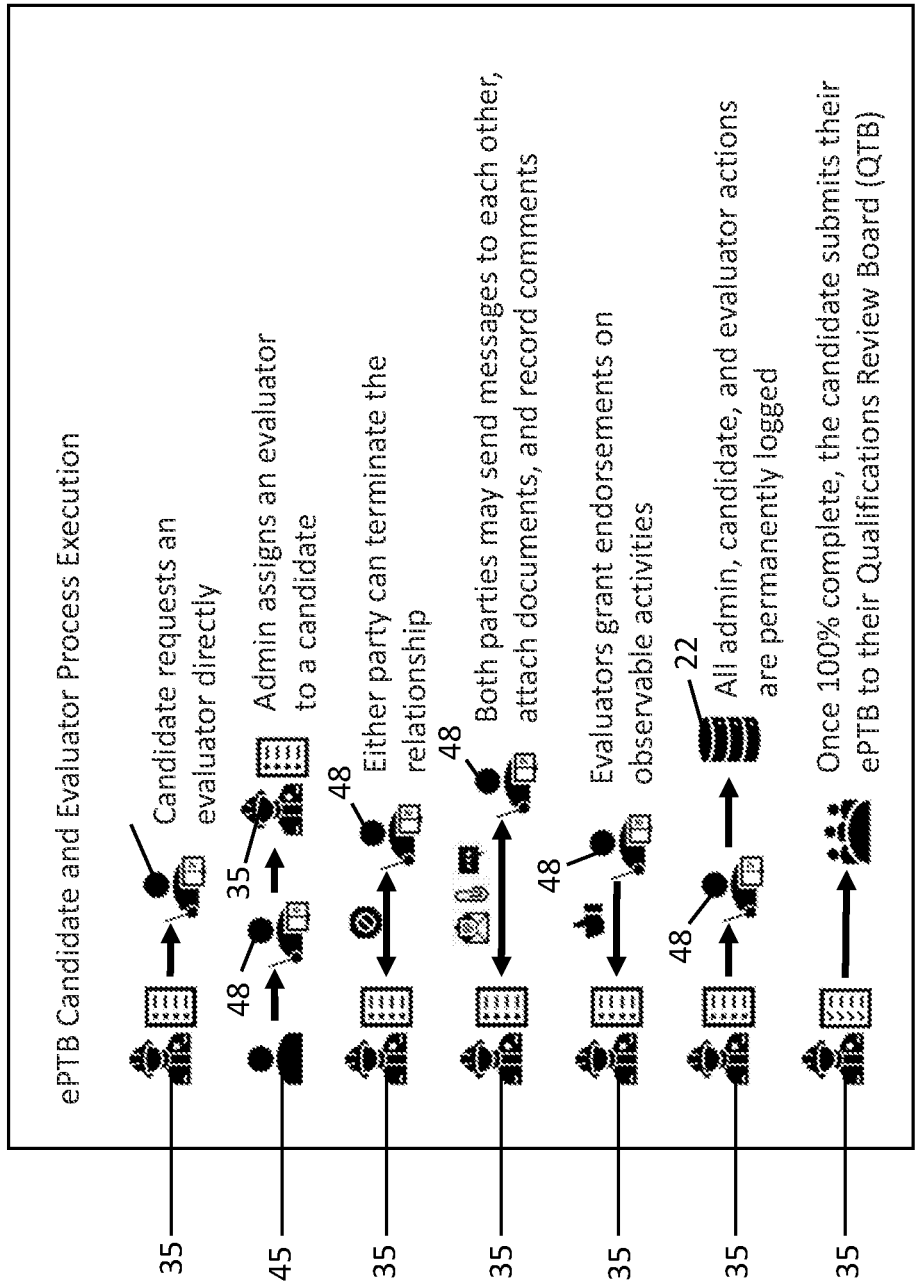
FIG. 11 is a relational diagram illustrating a plurality of exemplary relations between a candidate and an evaluator in accordance with at least one embodiment of the present invention.

For example, with reference to FIG. 11, as shown at 114A, a candidate 35 may directly request an evaluator 48, subject to rules established by the organization that issued the ePTB 200 to the candidate. The evaluator 48 needs to approve the request. For instance, an organization will typically require: that the evaluator 48 be qualified in the position the candidate 35 is pursuing; and be authorized to function as an evaluator 48. In addition, as shown at 104B, an organization 45 or administrator may reserve to itself the authority to assign evaluators 48 to candidates 35. This ensures that only authorized and qualified evaluators may be assigned to ePTBs or candidates; and that permanent records of evaluator assignments are maintained. This addresses long-standing problems of the existing paper-based qualifications management processes including: nepotism; evaluations be conducted by unqualified personnel; lack of transparency; and lack of accountability stemming from ineligible signatures and the loss or destruction of paper records.

Furthermore, as represented at 114C, either a candidate or an evaluator may terminate their relationship at any time. An administrator may also remove an evaluator from a candidate.

In addition, using the system 10 or method 100 of the present invention evaluators 48 and candidates 35 may: send each other messages; attach documents; and record comments 114D. In many cases, all these artifacts are visible to both parties as well as to authorized admins.

As shown at 114E, an evaluator 48 will use the "observed activities" of the ePTB requirements as a guide to identify which tasks performed by the candidate the evaluator should evaluate. Once the evaluator has determined that a given task has been completed successfully, they will "endorse the task". This operation is a core function of the electronic Position Task Book (ePTB) system. When the evaluator 48 endorses a task, the task is marked completed or endorsed in the ePTB record.

In most cases, all evaluator assignments and removals, messages, documents, comments, and task endorsements are permanently recorded indicating what action was taken, who performed the operation, and when 114F. This innovation provides the transparency and accountability which is not available in current paper-based qualifications management processes.

As described in greater detail in below in connection with blocks 116 and 118, once all certifiable activities have been completed (block 112) and all observed activities have been endorsed, the ePTB 200 will be marked as "complete" as generally represented by 114G. At this point, the candidate may submit the ePTB 200 to their designated "qualifications review board" (QRB) for review and approval.

Block 113: Responder Portal Mobile Process

It should be noted that in at least one embodiment of the system 10 and method 100, the individuals being qualified can be treated as key stakeholders in the process. Existing processes and systems are record keeping systems utilized by a small number of administrative users on behalf of the individuals being qualified. This is accomplished via "Responder Portal" software accessed by the individuals themselves from their mobile devices or other user devices 30 through corresponding or available software. These devices may either be issued by their organization's or owned by the individual in a "Bring Your Own Device" (BYOD) mode. In particular, the individual participant "owns" his/her own profile and/or record, which is portable and can "follow" the individual participant throughout his/her career.

As just an example, an individual participant may be "released" from employment by his/her organization, such as the City of Miami, Fla. This will set the individual's "home organization" to a default group, e.g., the "State of Florida Reserve Cadre". This individual participant may then be "adopted" by another organization or entity 45, such as Sarasota, Fla. The adoption process could be initiated either by the individual or the adopting organization, with all parties required to approve. Once effected, while the individual participant's new home organization will be the new organization, e.g., the city of Sarasota Fla., all previously awarded qualifications information and records will be seamlessly transferred between the jurisdictions.

For instance, from the Responder Portal, an individual may perform the following operations:

Update his/her account information (name, username, password, security question/answer)

Update his/her contact information and preferences. This allows the participant 35 to maintain access to the records and contact information, particularly during an adoption process as described herein.

Interact with their ePTBs or candidate ePTBs where they are assigned as an evaluator.

Interact with their assigned organizations. This includes requesting a release, transfer, or adoption.

Request updates to their personnel record including: award of training credit; ePTB task waivers; award of certification of educational attainment credit, etc.

Review their qualification history.

Block 116: Evaluate ePTB Status

Figure 12:
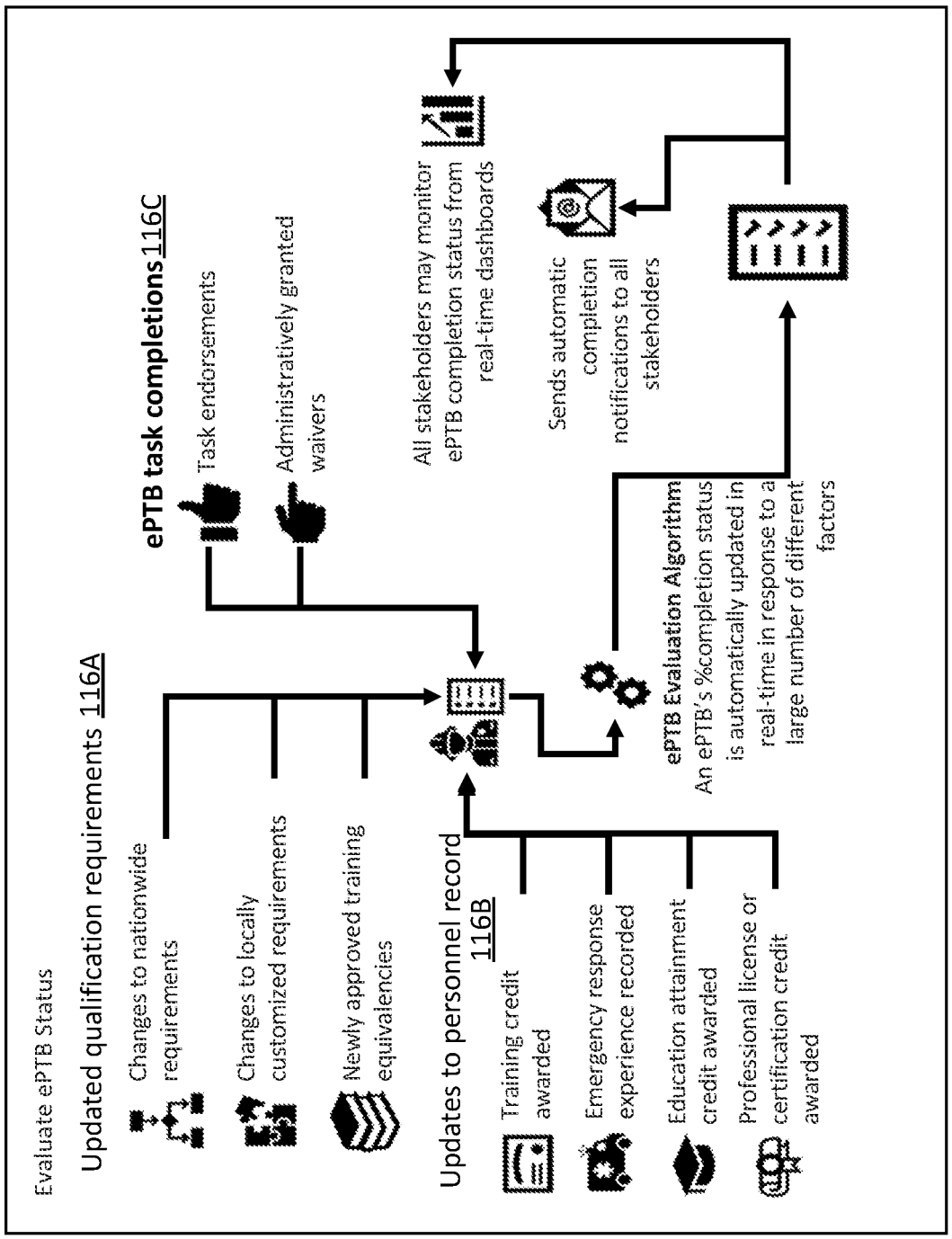
FIG. 12 is a relational and block diagram illustrating an exemplary process of evaluating an ePTB status as disclosed in accordance with at least one embodiment of the present invention.

With reference to FIG. 12, the completion status of an ePTB is perpetually, continuously or periodically updated in response to a number of activities. In particular, the system 10 or method 100 of at least one embodiment includes an evaluation algorithm which is configured to monitor the ePTB and generate a status or evaluation of it based upon various data and records contained therein.

For instance, as described in connection with block 110, an ePTB 200 will be automatically generated once an administrator or other user has issued one to a candidate, and ePTB 200 will contain a variety of requirements defined at various levels. As various actions are taken by system users, a "% Completion" value will be automatically generated by the ePTB Evaluation Algorithm. As shown in FIG. 12, actions which may be used to impact the % Completion value include:

Updated qualification requirements 116A including: changes to nationwide qualification requirements at the ICS resource, position group; or typed position levels; changes to locally defined requirements by the issuing organization itself or by one of its parent organizations; or changes to the nationwide training catalog approving training course equivalencies by other organizations. These changes, should they occur, will automatically cascade to currently opened ePTBs and will automatically update their qualification requirements.

Updates to a candidate's personnel record including: training credit awarded, either directly or in bulk; emergency response or recovery (i.e., disaster experience) actions recorded; education attainment (e.g., degree awarded) recorded; or a professional license or certificate (e.g., professional engineer, commercial driver's license, pilots license, state bar exam, etc.) recorded, etc.

ePTB tasks completed, either by being endorsed by an assigned evaluator or in response to being waived by an authorized administrator.

As the system is designed for multi-tenancy and could potentially be managing tens of thousands of active nationwide ePTBs 200 at any given time, any or all of which could be impacted by any of the actions described above, the ePTB Evaluation Algorithm is a complex software module which is capable of keeping all requirements synchronized automatically and in real-time.

All stakeholders (e.g., the candidates themselves, their evaluators, and various administrators) may at any time review a series of business intelligence components (e.g., reports and browser-based dashboards) the evaluate status of a single ePTB they are authorized to view. In addition, administrators may view summary business intelligence components for all ePTBs they have access to (e.g., their own organization as well as any subordinate organizations). In addition, the system sends out regular asynchronous notifications to all stakeholders summarizing ePTB completion status, as well as synchronous notifications upon ePTB completion.

Block 118: Submit for Approval

Once the ePTB Evaluation Algorithm establishes that a given ePTB is 100% complete, the candidate will be automatically notified (e.g., via email, text message, SMS message, push notification, phone call, letter, etc.) that it is ready to be submitted for approval. In at least one embodiment, the candidate or participant 35 will be provided with a link to their ePTB which they can first review and, when ready, then submit for approval. Upon submittal, the candidate or participant 35 will be automatically notified (e.g., via email, text message, SMS message, push notification, phone call, letter, etc.) and will be able to monitor their approval process via the Responder Portal. In addition, stakeholders involved in reviewing the ePTB will be automatically notified.

Block 120: Review ePTB

Figure 13:
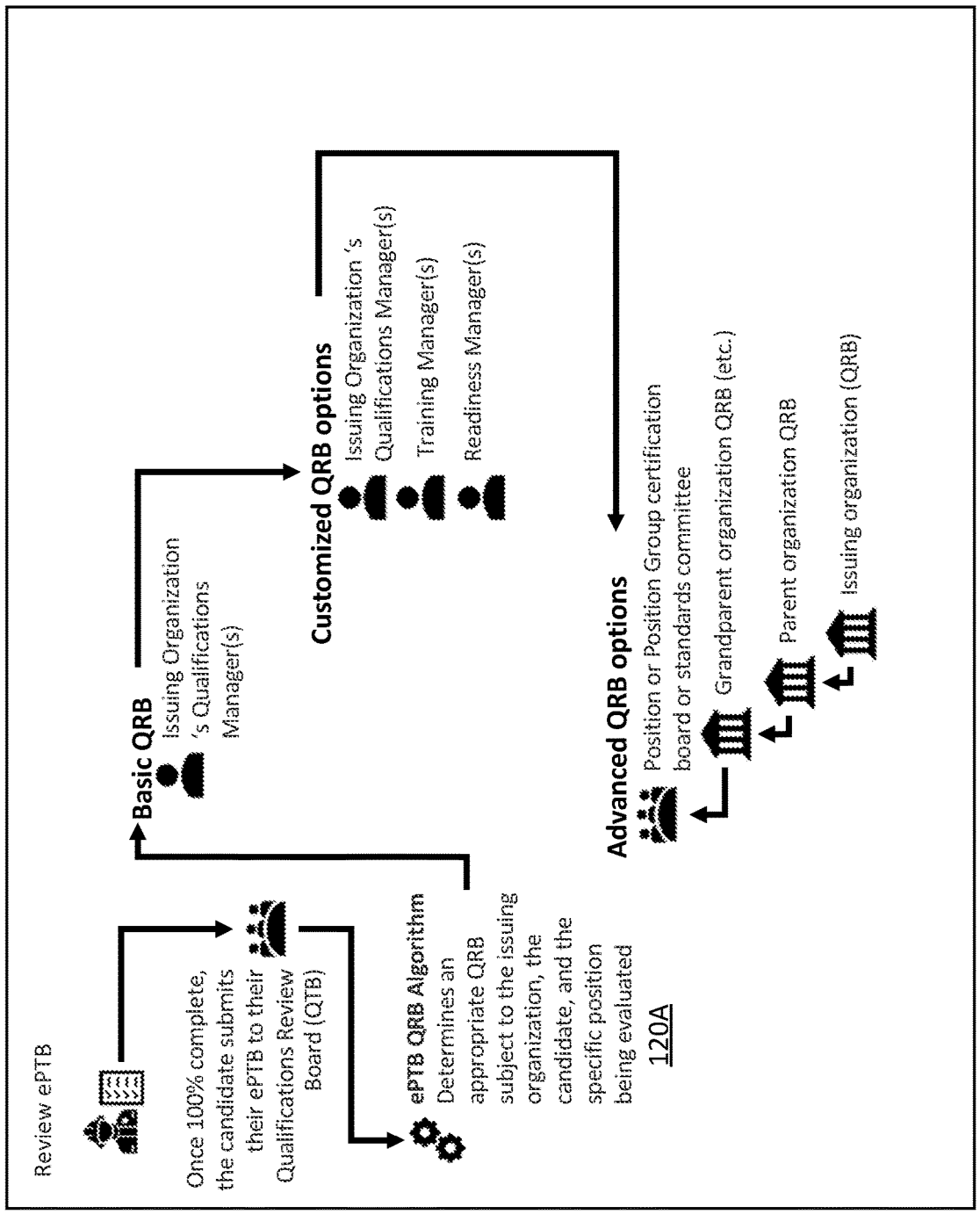
FIG. 13 is a relational and block diagram illustrating an exemplary process of reviewing an ePTB as disclosed in accordance with at least one embodiment of the present invention.

With reference to FIG. 13, after an ePTB has been submitted for approval, an automatic workflow process will be initiated, by an "ePTB QRB Algorithm" 120A constructing a "Qualifications Review Board" (QRB) whose responsibility it is to review the submitted ePTB, confirm that it was completed correctly and that all policies and procedures were correctly followed, and, once determined, to approve the ePTB.

In the event that no more complex configuration is required, the ePTB QRB Algorithm will construct a basic QRB consisting of the issuing organization's Qualifications Manager or, if no Qualifications Manager is assigned, of the issuing organization's Organization Manager.

An issuing organization also has the option of customizing their QRB, specifying multi-step reviews by, for instance, a Qualifications Manager, Training Manager, and/or Readiness Manager. In addition, the ePTB QRB Algorithm will account for more advanced configurations. For instance, a superior organization could specify that all or some of the ePTBs issued by subordinate organizations would need to be reviewed by the superior organization. In this manner, the State of Florida could reserve the authority to approve all "Incident Commander Type I" ePTBs, while Dade County, Fla. could reserve the right to approve all "Incident Commander Type II" ePTBs. In this manner, an Incident Commander Type I ePTB issued by the City of Miami, Fla. would need to be approved by: The City of Miami QRB; the Dade County, Fla. QRB; and the State of Florida QRB. Finally, some ePTBs may require approval by a national certification board or standards committee. For instance, the administrators of a highly technical and sensitive position like a "Radiological Operations Support Specialist—Type I" (ROSS—Type I) may reserve the right to approve any of these ePTBs. In this manner, a ROSS—Type I ePTB issued by the City of Miami Fla. could potentially require approval by: the City of Miami, Fla. QRB; the Dade County QRB; the State of Florida QRB; and the national ROSS governing board.

The system automatically issues notifications, provides stakeholders with user interfaces allowing them to review and approve workflow steps assigned to them, updates statuses in real-time, and records all activities in permanently maintained action logs.

The ability to consistently and securely manage qualifications of both low-level positions through locally-administered QRBs and high-level sensitive positions through multi-level regional and national QRBs with a high degree of transparency and accountability is a key innovation of the system.

Block 122: Approve ePTB

If the ePTB is approved by the QRB, the candidate will be automatically notified as well as their designated Qualifications Manager(s), Training Manager(s) and other stakeholders. The ePTBs: status and associated statistics will be automatically updated; a new Personnel Position record will be created for the candidate within their Personnel Profile, providing a permanent link back to the associated ePTB; and the qualifications statistics of the individuals associated organizations will be automatically updated (e.g., their number of qualified personnel, generally and by specific position categories, types, and positions). The individual will then be able to review and maintain permanent control of their qualifications history via the Responder Portal, and their organization and related organizations with access to their Personnel record will be able to review the individuals qualifications history for the purpose of emergency management preparedness, planning, response, and recovery decisions and actions.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention. This written description provides an illustrative explanation and/or account of the present invention. It may be possible to deliver equivalent benefits using variations of the specific embodiments, without departing from the inventive concept. This description and these drawings, therefore, are to be regarded as illustrative and not restrictive.

Now that the invention has been described.

What is claimed is:

1. A method for managing qualifications of emergency management personnel, the method comprising:
   using at least one processor at a cloud-based qualifications management system, creating a nationwide hierarchy of emergency management personnel positions defining a plurality of positions,
   for each of the positions defined in the nationwide hierarchy of emergency management personnel positions, creating a national Qualifications Sheet, each of the national Qualifications Sheets defining a plurality of national qualification requirements associated with the corresponding position,
   using the at least one processor at the cloud-based qualifications management system, defining a plurality of local positions and associating each of the plurality of local positions with at least one of the plurality of positions defined in the nationwide hierarchy of emergency management personnel positions,
   for each of the local positions, creating a local Qualifications Sheet, the local Qualifications Sheet defining a plurality of additional local qualification requirements associated with the corresponding local position,
   receiving, at the at least one processor at the cloud-based qualifications management system, a request to identify at least one candidate for an identified position,
   determining, at the at least one processor at the cloud-based qualifications management system, a plurality of qualifications associated with the identified position, wherein the plurality of qualifications associated with the identified position comprises all hierarchically-associated qualification requirements,
   using the at least one processor at the cloud-based qualifications management system, automatically identifying at least one candidate from a pool of candidates based upon a participant record associated with the at least one candidate,
   using the at least one processor at the cloud-based qualifications management system, issuing an electronic Position Task Book for the at least one candidate, the electronic Position Task Book comprising data corresponding to a status of each of the plurality of qualifications associated with the identified position, and
   updating the data of the electronic Position Task Book as the identified candidate completes at least one of the plurality of qualifications associated with the identified position.

2. The method as recited in claim 1 wherein the nationwide hierarchy of emergency management personnel positions comprises at least a plurality of Categories, for each of the plurality of Categories, the nationwide hierarchy of emergency management personnel positions further comprises a plurality of Position Groups, and for each of the plurality of Position Groups, the nationwide hierarchy of emergency management personnel positions further comprises a plurality of Position Types.

3. The method as recited in claim 1 wherein, when all of the plurality of qualifications associated with the identified position are satisfied, submitting the electronic Position Task Book for approval.

4. The method as recited in claim 3 wherein, when the electronic Position Task Book is approved, automatically notifying the at least one candidate with an approval notification and updating a status of electronic Position Task Book as approved.

5. The method as recited in claim 1 further comprising defining the electronic Position Task Book as comprising a plurality of administrative data and qualification requirement data.

6. The method as recited in claim 5 further comprising defining the qualification requirements data of the electronic Position Task Book as comprising Certifiable Activities and Observable Activities, wherein the Observable Activities comprise activities observable by an Evaluator.

7. The method as recited in claim 6 further comprising, using the at least one processor at the cloud-based qualifications management system, matching the at least one candidate with the Evaluator.

8. The method as recited in claim 7 further comprising logging evaluator credentials at the cloud-based qualifications management system.

9. The method as recited in claim 8 further comprising, using the at least one processor at the cloud-based qualifications management system, prior to matching the at least one candidate with the Evaluator, automatically reviewing evaluator credentials associated with the Evaluator and comparing the evaluator credentials with minimum credentials required to provide an endorsement for the identified position.

10. A method for managing qualifications of professional personnel, the method comprising:
   using at least one processor at a qualifications management system, creating a hierarchy of personnel positions defining a plurality of positions,
   for each of the positions defined in the hierarchy of personnel positions, creating a Qualifications Sheet, each of the Qualifications Sheets defining a plurality of qualification requirements associated with the corresponding position,
   using the at least one processor at the qualifications management system, defining a plurality of local positions,
   using the at least one processor at the qualifications management system, associating each of the plurality of local positions with at least one of the plurality of positions defined in the hierarchy of personnel positions,
   for each of the local positions, creating a local Qualifications Sheet, the local Qualifications Sheet defining a plurality of additional local qualification requirements associated with the corresponding local position,
   receiving, at the at least one processor at the qualifications management system, a request to identify at least one candidate for an identified local position,
   identifying, at the at least one processor at the qualifications management system, a plurality of qualification requirements associated with the identified local position, wherein the plurality of qualification requirements associated with the identified position comprises additional local qualification requirements defined by a corresponding local Qualifications Sheet the qualification requirements defined by the Qualifications Sheet of the at least one of the plurality of positions defined in the hierarchy of personnel positions associated with the local position, using the at least one processor at the qualifications management system, automatically identifying at least one candidate from a pool of candidates based upon a participant record associated with the at least one candidate, using the at least one processor at the qualifications management system, issuing an electronic Position Task Book for the at least one candidate, the electronic Position Task Book comprising data corresponding to a status of each of the plurality of qualification requirements associated with the local position, the qualification requirements of the electronic Position Task Book comprising Certifiable Activities and Observable Activities, wherein the Observable Activities are defined as activities that require observation by an Evaluator, and using the at least one processor at the qualifications management system, matching the at least one candidate with the Evaluator.

11. The method as recited in claim 10 further comprising, using the at least one processor at the qualifications management system, prior to matching the at least one candidate with the Evaluator, automatically reviewing evaluator credentials associated with the Evaluator and comparing the evaluator credentials with minimum credentials required to provide an endorsement for the identified position.

12. The method as recited in claim 10 wherein the hierarchy of personnel positions comprises at least a plurality of Categories, for each of the plurality of Categories, the hierarchy of personnel positions further comprises a plurality of Position Groups, and for each of the plurality of Position Groups, the hierarchy of personnel positions further comprises a plurality of Position Types.

13. The method as recited in claim 10 further comprising updating the data of the electronic Position Task Book as the identified candidate completes at least one of the plurality of qualifications associated with the identified position.

14. The method as recited in claim 13 wherein, when all of the plurality of qualification requirements associated with the local position are satisfied, submitting the electronic Position Task Book for approval.

15. The method as recited in claim 14 wherein, when the electronic Position Task Book is approved, automatically notifying the at least one candidate with an approval notification and updating a status of electronic Position Task Book as approved.

* * * * *